(12) United States Patent
Hayashida et al.

(10) Patent No.: US 9,574,106 B2
(45) Date of Patent: *Feb. 21, 2017

(54) OPTICAL ELEMENT MATERIAL AND METHOD FOR PRODUCING SAME

(71) Applicant: MARUZEN PETROCHEMICAL CO., LTD., Chuo-ku (JP)

(72) Inventors: Yoshihisa Hayashida, Ichihara (JP); Takuro Satsuka, Ichihara (JP); Teruyo Ikeda, Ichihara (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,474

(22) PCT Filed: Sep. 25, 2012

(86) PCT No.: PCT/JP2012/074568
§ 371 (c)(1),
(2) Date: Mar. 26, 2014

(87) PCT Pub. No.: WO2013/047524
PCT Pub. Date: Apr. 4, 2013

(65) Prior Publication Data
US 2014/0287219 A1     Sep. 25, 2014

(30) Foreign Application Priority Data

Sep. 27, 2011 (JP) ................... 2011-211445

(51) Int. Cl.
*C09D 139/04* (2006.01)
*G02B 1/12* (2006.01)
(Continued)

(52) U.S. Cl.
CPC .............. *C09D 139/04* (2013.01); *C08F 2/50* (2013.01); *C08F 222/1006* (2013.01);
(Continued)

(58) Field of Classification Search
CPC ........... C09D 138/04; G02B 1/10; G02B 1/12; G02B 1/04; C08F 222/1006; C08F 226/12; C08F 2/50
(Continued)

(56) References Cited

U.S. PATENT DOCUMENTS

2004/0202892 A1* 10/2004 Yasuda et al. ................ 428/690
2009/0143505 A1*  6/2009 Samukawa et al. ............ 524/89
(Continued)

FOREIGN PATENT DOCUMENTS

CN      101415736 A     4/2009
JP      2004 4605       1/2004
(Continued)

OTHER PUBLICATIONS

International Search Report Issued Dec. 25, 2012 in PCT/JP12/074568 Filed Sep. 25, 2012.
(Continued)

*Primary Examiner* — Aaron Austin
*Assistant Examiner* — Michael Zhang
(74) *Attorney, Agent, or Firm* — Oblon, McClelland, Maier & Neustadt, L.L.P.

(57) ABSTRACT

An optical element material which is obtained by curing a resin composition for photoimprinting containing a photocurable monomer (A) of the formula (1) and a photocurable monomer (B) of the formula (2) in a weight ratio of from 30/70 to 87/13, and containing a photopolymerization initiator (C) in a content of from 0.01 to 30 parts by weight per 100 parts by weight of the total weight of the monomer (A) and the monomer (B), and which has a shrinkage on curing of at most 4.5%, and a method for producing it:

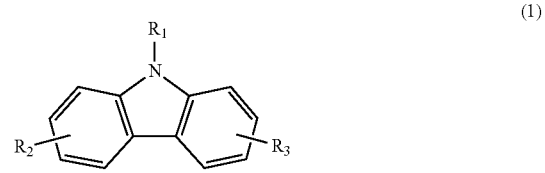

(1)

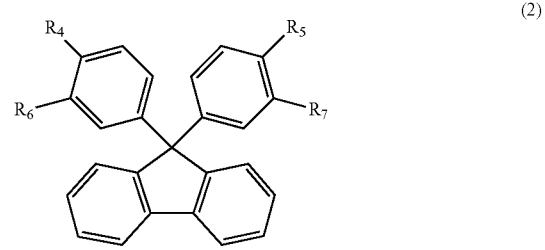

(2)

wherein $R_1$ is —CH=CH$_2$, —CH$_2$CH$_2$—O—CH=CH$_2$, —CH$_2$—C(CH$_3$)=CH$_2$ or a glycidyl group; $R_2$ and $R_3$ are each independently hydrogen or a $C_{1-4}$ alkyl group; $R_4$ and $R_5$ are each independently —O—CH=CH$_2$, —O—CH$_2$CH$_2$—O—CH=CH$_2$, —O—CO—CH=CH$_2$, —O—CO—C(CH$_3$)=CH$_2$, —O—CH$_2$CH$_2$—O—CO—CH=CH$_2$, —O—CH$_2$CH$_2$—O—CO—C(CH$_3$)=CH$_2$ or a glycidyl ether group; and $R_6$ and $R_7$ are each independently hydrogen or a $C_{1-4}$ alkyl group.

13 Claims, No Drawings

(51) Int. Cl.
  *G02B 1/10* (2015.01)
  *C08F 2/50* (2006.01)
  *C08F 226/12* (2006.01)
  *G02B 1/04* (2006.01)
  *C08F 222/10* (2006.01)

(52) U.S. Cl.
  CPC .............. *C08F 226/12* (2013.01); *G02B 1/04* (2013.01); *G02B 1/10* (2013.01); *G02B 1/12* (2013.01)

(58) Field of Classification Search
  USPC ... 428/195.1, 220; 522/138, 167, 31, 33, 39; 526/167, 259
  See application file for complete search history.

(56) References Cited

U.S. PATENT DOCUMENTS

| | | | |
|---|---|---|---|
| 2010/0261018 A1* | 10/2010 | Turshani | B32B 7/12 428/414 |
| 2013/0288021 A1 | 10/2013 | Hayashida et al. | |

FOREIGN PATENT DOCUMENTS

| | | | |
|---|---|---|---|
| JP | 2008 116971 | | 5/2008 |
| JP | 2008 158361 | | 7/2008 |
| JP | 2009 91462 | | 4/2009 |
| JP | 2009 114374 | | 5/2009 |
| JP | 2009 249591 | | 10/2009 |
| JP | 2010 37470 | | 2/2010 |
| JP | 2010 197682 | | 9/2010 |
| JP | 2011013601 A | * | 1/2011 |
| JP | 2011 33875 | | 2/2011 |
| JP | 2011053518 A | * | 3/2011 |
| TW | 201114783 A1 | | 5/2011 |

OTHER PUBLICATIONS

Combined Office Action and Search Report issued Apr. 3, 2015 in Chinese Patent Application No. 201280042467.1 (with English language translation and English translation of Category of Cited Documents).

* cited by examiner

OPTICAL ELEMENT MATERIAL AND METHOD FOR PRODUCING SAME

CROSS-REFERENCE TO RELATED APPLICATIONS

This application is a National Stage of PCT/JP2012/074568 filed on Sep. 25, 2012. This application is based upon and claims the benefit of priority to Japanese Application No. 2011-211445 filed on Sep. 27, 2011, the entire contents of which are incorporated herein by reference.

TECHNICAL FIELD

The present invention relates to an optical element material comprising a cured product of a resin composition for photoimprinting with a small cure shrinkage at the time of curing, being excellent in the dimensional accuracy, having a high refractive index and having excellent transparency, and its production method.

BACKGROUND ART

In recent years, application of plastic materials to optical articles is remarkable, and for example, plastic materials have already been used or are studied to be used for various optical articles such as a panel for a liquid crystal display, a protective film for a color filter, an eyeglass lens, a Fresnel lens, a lenticular lens, a prism lens sheet for a TFT (thin film transistor), an aspherical lens, a coating agent for an optical disk, a core material or a clad material for optical fibers, an optical waveguide, and an adhesive for optical fiber connection.

Plastic materials have been widely used by virtue of their characteristics such that they are easily molded and they are light in weight.

On the other hand, a member for an optical material such as a lens, a prism or a phase element is required to have a high refractive index as an important physical property. For example, in the case of a lens, having a high refractive index is advantageous in that the lens can be downsized or spherical aberration can be reduced. Further, as the base material of the optical material, glass has been well known, however, use of a resin material is desired in view of the weight saving, the economical efficiency, the safety etc. However, a resin material does not have a refractive index as high as glass, and incorporation of inorganic fine particles has been proposed for the purpose of increasing the refractive index, but such may impair the transparency. Accordingly, development of a high refractive index resin only by resin components is desired.

Further, an optical lens such as a prism lens sheet or a Fresnel lens to be used for backlight of a liquid crystal display has a higher transmittance along with e.g. high definition of images in recent years, and its lens shape becomes more complicated and defined, and accordingly its material is desired to have a low viscosity so that handling and forming are easily conducted. Further, in the field of optical communication such as optical fibers and an optical waveguide employing light having a wavelength region of from 650 to 1,600 nm, a resin which is less deformed at the time of curing, that is, which has low shrinkage on curing, has been desired to prevent separation from a substrate and to improve the accuracy of finishing. Further, a cured product having a high glass transition temperature has been desired in order that the shape and the like will not change at the time of use under high temperature environment.

For example, Patent Document 1 discloses that a resin containing a compound having a carbazoyl group is excellent in optical properties such as a high refractive index resulting from the compound having a carbazoyl group, the photorefractive effect, photoconductivity and hole transport property. Particularly in recent years, in view of demands for a high refractive index of plastic materials, the high refractive index of compounds having a carbazoyl group attracts attention, and many attempts to develop a novel highly transparent plastic material are made.

However, in a case where a low molecular weight carbazole compound is used as added to a resin composition, it is hardly soluble in a polymer, and cannot uniformly be mixed in many cases. Further, in a case where it is uniformly mixed forcibly, problems such as bleed out from the resin matrix will occur. Further, N-vinylcarbazole (NVCz) which is a reactive carbazole compound has problems such as low copolymerizability and toxicity in addition to the low solubility. Further, many of carbazoles are solid, and they can hardly be handled as a photocurable resin as they are. Therefore, a plastic material from which a cured product can easily be obtained, of which a cured molded product has a high refractive index, and which can easily be handled, has been desired.

Patent Document 2 discloses an optical material comprising a resin composition containing at least N-vinylcarbazole, polyvinylcarbazole and a photopolymerization initiator, such that crystallization of the optical material can be suppressed in molding at room temperature, the dropping amount suitable for replica molding can properly be controlled, and an optical element with a higher refractive index dispersion is formed by photopolymerization. However, such a resin composition for an optical material has a high viscosity, and application and curing are carried out while heating it at 80° C. Further, vinylcarbazole does not have favorable heat stability, and may form an oligomer component when heated, whereby stable production may not be possible.

Patent Documents 3 and 4 disclose an optical material composition which has an appropriate anomalous dispersion property when formed into a cured product and which is easily processed, and as an optical element using its cured product, a resin composition comprising a (meth)acryloyloxy group-containing compound having a fluorene ring, a compound having at least one (meth)acryloyl group or vinyl group in one molecule and having no fluorene ring, and a polymerization initiator. However, a bisarylfluorene compound used in these documents has a very high viscosity at room temperature and is difficult to handle. Further, due to the high viscosity, packing in a defined shape may be difficult.

Patent Document 5 discloses as a resin composition suitable for an optical lens to be formed on a substrate such as a lenticular lens, a prism lens or a microlens, and as a cured product having excellent transmittance and releasability and having a lower shrinkage on curing, an energy ray-curable resin composition for an optical lens comprising an urethane (meth)acrylate having a bisphenol A skeleton, a polyalkylene oxide-modified bisphenol A di(meth)acrylate and a photopolymerization initiator. However, the shrinkage on curing of the resin composition using bisphenol A type diacrylate is less than 5% and is not yet satisfactory.

Patent Document 6 discloses a resin composition comprising as an essential component a polymer having a polymerizable reactive group suitable for an optical waveguide by virtue of the heat resistance and low shrinkage on curing, however, the shrinkage on curing is about 5%, and the heat resistance is not necessarily sufficient.

PRIOR ART DOCUMENTS

Patent Documents

Patent Document 1: JP-A-2009-091462
Patent Document 2: JP-A-2004-004605
Patent Document 3: JP-A-2010-037470
Patent Document 4: JP-A-2008-158361
Patent Document 5: JP-A-2011-033875
Patent Document 6: JP-A-2008-116971

DISCLOSURE OF INVENTION

Technical Problem

Under these circumstances, it is an object of the present invention to provide an optical element having excellent dimensional accuracy, a high refractive index and excellent transparency, which is obtained by curing a resin composition for photoimprinting which has an appropriate viscosity, which is easily handled and which has low shrinkage on curing at the time of curing, and its production method.

Solution to Problem

The present inventors have conducted extensive studies to achieve the above object and as a result, found that a resin composition for photoimprinting which contains, as photocurable monomers, at least one type of photocurable monomers (A) represented by the following formula (1) having a carbazole skeleton and a photocurable monomer (B) having a specific cyclic hydrocarbon structure represented by the following formula (2) and a photopolymerization initiator (C) in a specific proportion, has an easy handleable viscosity, and its cured product is an optical element material having a high refractive index, excellent transparency and low shrinkage on curing and further excellent dimensional accuracy.

The present invention has been accomplished on the basis of the above discovery and provides the following.
1. An optical element material which is obtained by curing a resin composition for photoimprinting containing a photocurable monomer (A) represented by the following formula (1) having a carbazole skeleton, a photocurable monomer (B) represented by the following formula (2) and a photopolymerization initiator (C) in a weight ratio of the photocurable monomer (A) to the photocurable monomer (B) ((the weight of the photocurable monomer (A))/(the weight of the photocurable monomer (B)) of from 30/70 to 87/13 in a content of the photopolymerization initiator (C) of from 0.01 to 30 parts by weight per 100 parts by weight of the total weight of the photocurable monomer (A) and the photocurable monomer (B), and which has a shrinkage on curing of at most 4.5% at the time of curing:

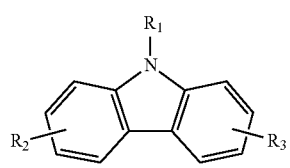

(1)

wherein $R_1$ is —CH=CH$_2$, —CH$_2$CH$_2$—O—CH=CH$_2$, —CH$_2$—C(CH$_3$)=CH$_2$ or a glycidyl group, and $R_2$ and $R_3$ are each independently hydrogen or a $C_{1-4}$ alkyl group;

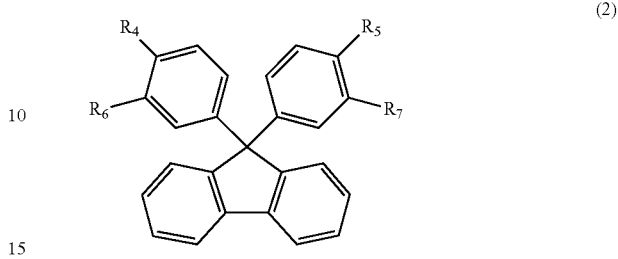

(2)

wherein $R_4$ and $R_5$ are each independently —O—CH=CH$_2$, —O—CH$_2$CH$_2$—O—CH=CH$_2$, —O—CO—CH=CH$_2$, —O—CO—C(CH$_3$)=CH$_2$, —O—CH$_2$CH$_2$—O—CO—CH=CH$_2$, —O—CH$_2$CH$_2$—O—CO—C(CH$_3$)=CH$_2$ or a glycidyl ether group, and $R_6$ and $R_7$ are each independently hydrogen or a $C_{1-4}$ alkyl group.
2. The optical element material according to the above 1, wherein the resin composition for photoimprinting further contains a viscosity-adjusting agent (D) in an amount of from 0.1 to 100 parts by weight per 100 parts by weight of the total weight of the photocurable monomer (A) and the photocurable monomer (B).
3. The optical element material according to the above 1 or 2, wherein the resin composition for photoimprinting further contains a solvent (G) in an amount of from 0.5 to 30,000 parts by weight per 100 parts by weight of the total weight of the photocurable monomer (A) and the photocurable monomer (B).
4. The optical element material according to any one of the above 1 to 3, which has a refractive index to light having a wavelength of 589 nm of at least 1.58.
5. The optical element material according to any one of the above 1 to 4, which has a glass transition temperature of at least 100° C.
6. The optical element material according to any one of the above 1 to 5, which has a transmittance (when the thickness is 20 μm) to light having a wavelength of 400 nm of at least 80%.
7. The optical element material according to any one of the above 1 to 6, which is in the form of a film or sheet having a resin thickness of from 50 nm to 10 mm.
8. The optical element material according to any one of the above 1 to 6, which is a pickup lens, a non-objective lens, a polarizing film, a phase difference film, a light diffusing film, a condensing film, a lenticular sheet, a member for a liquid crystal element, a lens for a photoelectric conversion element, a microlens or a wafer level lens.
9. A method for producing an optical element material, which comprises applying a resin composition for photoimprinting containing a photocurable monomer (A) represented by the above formula (1) having a carbazole skeleton, a photocurable monomer (B) represented by the above formula (2) and a photopolymerization initiator (C) in a weight ratio of the photocurable monomer (A) to the photocurable monomer (B) ((the weight of the photocurable monomer (A))/(the weight of the photocurable monomer (B))) of from 30/70 to 87/13 in a content of the photopolymerization initiator (C) of from 0.01 to 30 parts by weight per 100 parts by weight of the total weight of the photocurable monomer (A) and the photocurable monomer (B), to a substrate to form a coating film, and irradiating the surface of the coating film with light for curing with a shrinkage on curing of at most 4.5%.

10. The method for producing an optical element material according to the above 9, wherein a pattern is transferred on the surface of the coating film by an imprinting method, and then the coating film is irradiated with light for curing.

11. The method for producing an optical element material according to the above 9 or 10, wherein the substrate to which the resin composition for photoimprinting is applied is a film or sheet made of a resin or an inorganic material, having a thickness of from 0.5 μm to 10 mm.

Advantageous Effects of Invention

According to the present invention, by using the above resin composition which has an easily handleable viscosity, which is easily cured by irradiation with e.g. ultraviolet light (UV) and which has low shrinkage on curing at the time of curing, an optical element material which is a cured product excellent in the dimensional accuracy, which has an optically high refractive index and excellent transparency, and which also has high heat resistance, is provided.

DESCRIPTION OF EMBODIMENTS

The resin composition to be used for production of the optical element material of the present invention comprises at least one type of carbazole compounds represented by the above formula (1) as the photocurable monomer (A). Such a carbazole compound is excellent in optical properties such as high refractive index, photorefractive effect and photoconductivity, and has a sensitizing effect in photo-curing. Further, such a carbazole compound can be liquefied at room temperature by being mixed with the compound of the above formula (2) as the photocurable monomer (B), and its viscosity can be adjusted to preferably from 10 mPa·s to 2,500,000 mPa·s, particularly preferably from 100 mPa·s to 2,000,000 mPa·s (at a temperature of from 20 to 50° C.), whereby the resin composition will easily be handled.

In the above formula (1), $R_1$ is —CH=CH$_2$, —CH$_2$CH$_2$—O—CH=CH$_2$, —CH$_2$—C(CH$_3$)=CH$_2$ or a glycidyl group. $R_1$ is particularly preferably —CH=CH$_2$, —CH$_2$CH$_2$—O—CH=CH$_2$ or a glycidyl group.

Further, each of $R_2$ and $R_3$ is hydrogen or a $C_{1-4}$ alkyl group, and is preferably hydrogen, a methyl group or an ethyl group, particularly preferably hydrogen or a methyl group.

As preferred examples of the carbazole compound represented by the formula (1), the following formulae (1)-1 to (1)-12 may be mentioned.

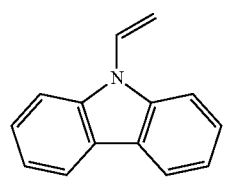

Formula (1)-1

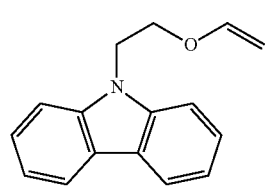

Formula (1)-2

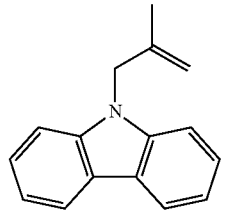

Formula (1)-3

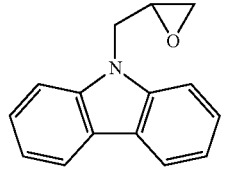

Formula (1)-4

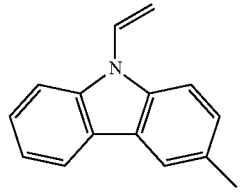

Formula (1)-5

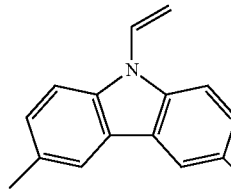

Formula (1)-6

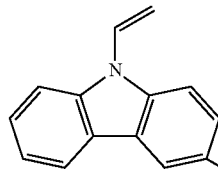

Formula (1)-7

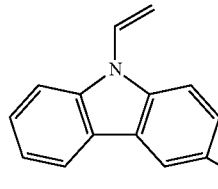

Formula (1)-8

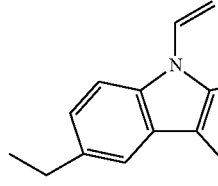

Formula (1)-9

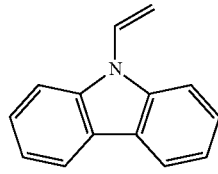

Formula (1)-10

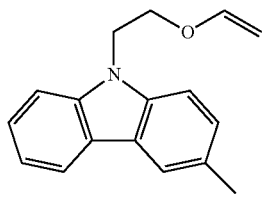

Formula (1)-11

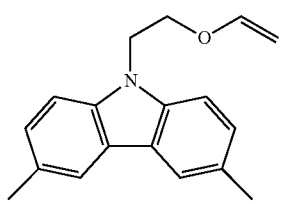

Formula (1)-12

Among the above formulae, more preferred is the formula (1)-1, (1)-2, (1)-3 or (1)-4. Further, among the above formulae, particularly preferred is the formula (1)-1, (1)-2 or (1)-4.

As the carbazole compound of the formula (1), two or more types of the above compounds may be used.

The resin composition for photoimprinting of the present invention contains a fluorene compound represented by the formula (2) as the photocurable monomer (B).

As the effect by the photocurable monomer (B) represented by the formula (2), in view of the properties of the resin composition cured after mixed with the photocurable monomer (A) represented by the formula (1), the refractive index is improved in some cases, the viscosity is reduced, and the processability is improved, as compared with a resin composition obtained by curing the photocurable monomer (B) alone. Further, since the structure after curing is rigid, such effects can be expected that the fine structure is hardly broken, and the shrinkage on curing tends to be low.

In the fluorene compound having a cyclic hydrocarbon structure represented by the above formula (2), $R_4$ and $R_5$ are each independently —O—CH=CH$_2$, —O—CH$_2$CH$_2$—O—CH=CH$_2$, —O—CO—C(CH$_3$)=CH$_2$, —O—CH$_2$CH$_2$—O—CO—CH=CH$_2$, —O—CH$_2$CH$_2$—O—CO—C(CH$_3$)=CH$_2$ or a glycidyl ether group.

Each of $R_4$ and $R_5$ is particularly preferably —O—CH$_2$CH$_2$—O—CH=CH$_2$, —O—CO—CH=CH$_2$, —O—CO—C(CH$_3$)=CH$_2$, —O—CH$_2$CH$_2$—O—CO—CH=CH$_2$, —O—CH$_2$CH$_2$—O—CO—C(CH$_3$)=CH$_2$ or a glycidyl ether group. $R_6$ and $R_7$ are each independently hydrogen or a $C_{1-4}$ alkyl group. Each of $R_6$ and $R_7$ is preferably hydrogen, a methyl group or an ethyl group, particularly preferably hydrogen or a methyl group.

As preferred examples of the fluorene compound represented by the formula (2), compounds of the following formulae (2)-1 to (2)-42 may be mentioned.

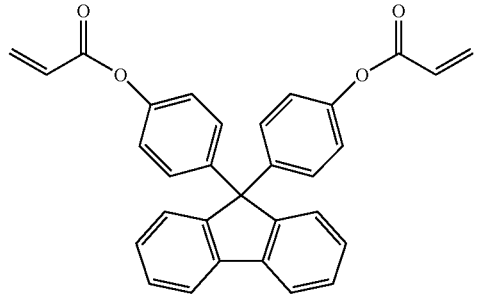

Formula (2)-1

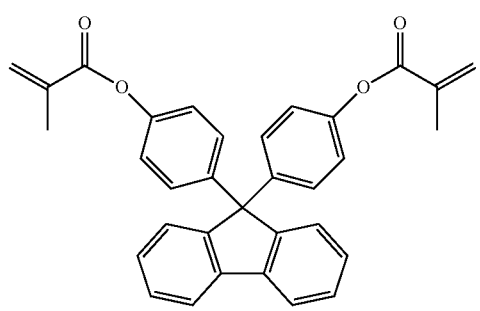

Formula (2)-2

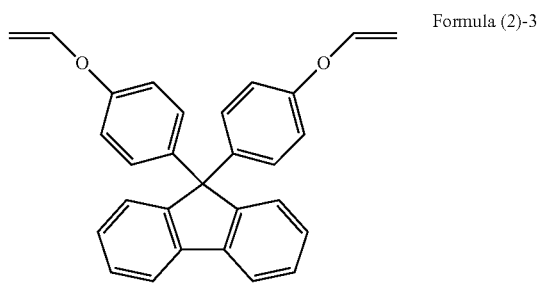

Formula (2)-3

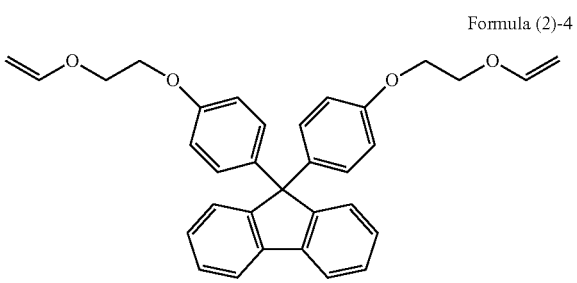

Formula (2)-4

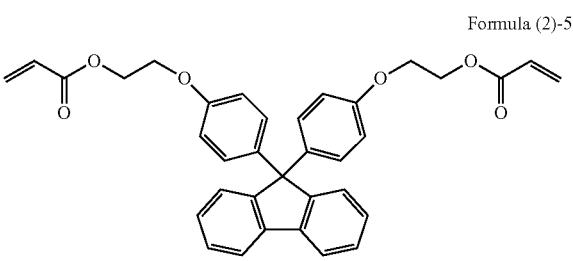

Formula (2)-5

Formula (2)-6
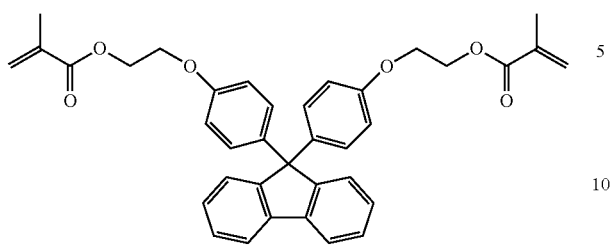
Formula (2)-7
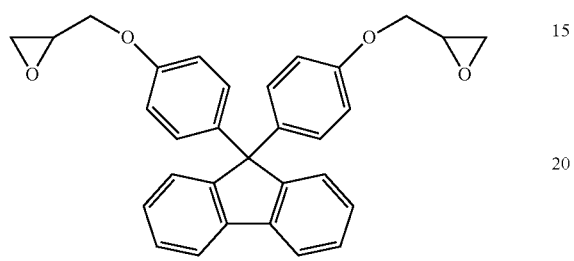
Formula (2)-8
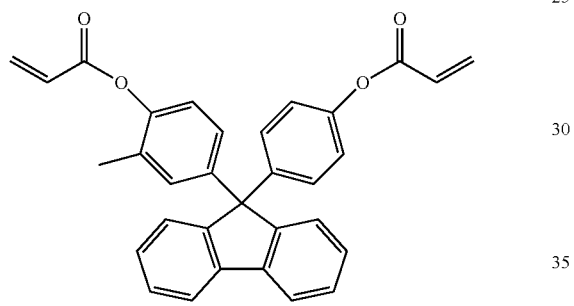
Formula (2)-9
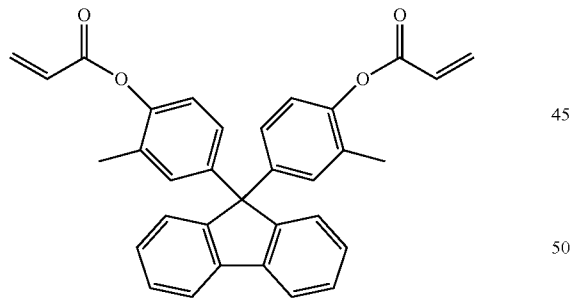
Formula (2)-10
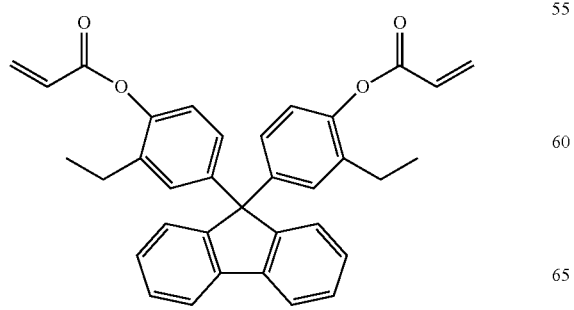
Formula (2)-11
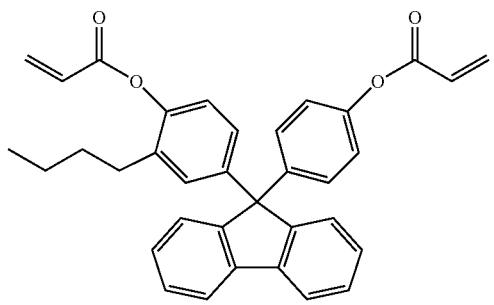
Formula (2)-12
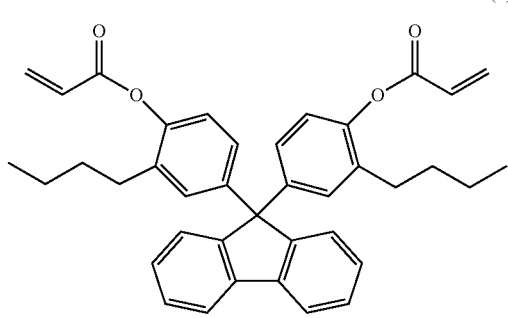
Formula (2-13)
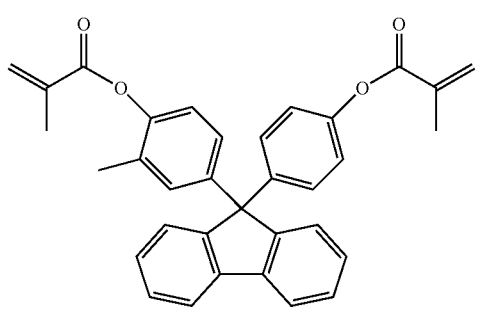
Formula (2)-14
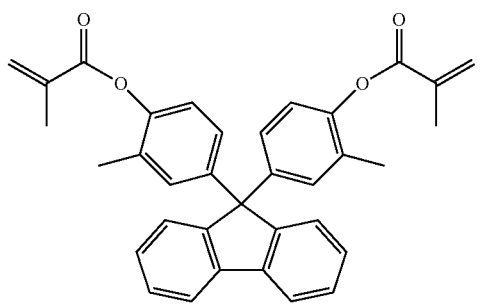
Formula (2)-15
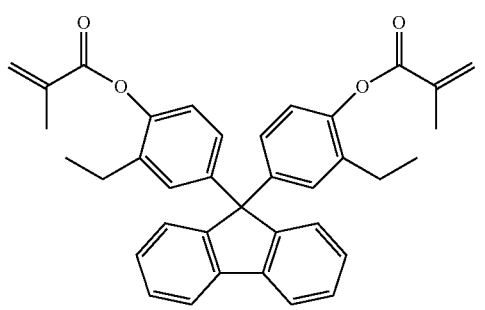

Formula (2)-16
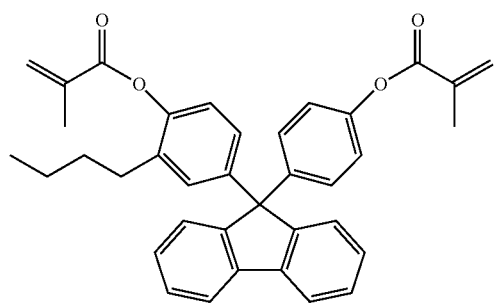
Formula (2)-17
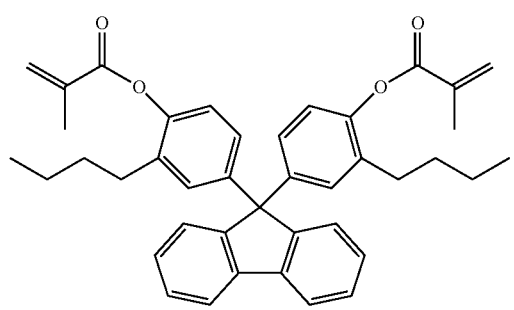
Formula (2)-18
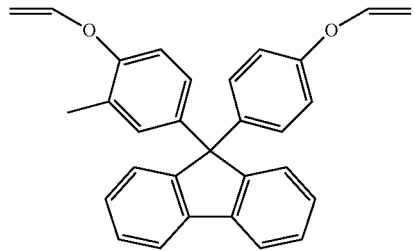
Formula (2)-19
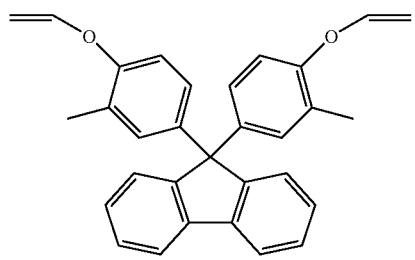
Formula (2)-20
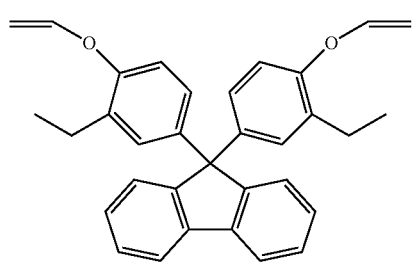
Formula (2)-21
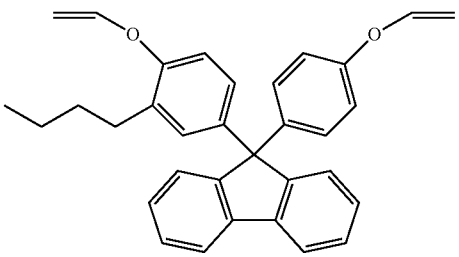
Formula (2)-22
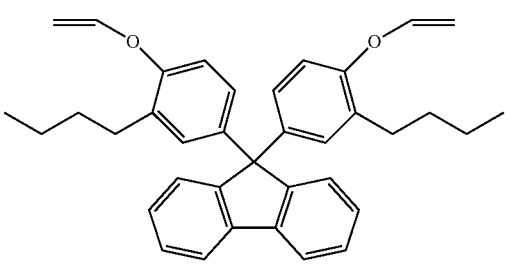
Formula (2)-23
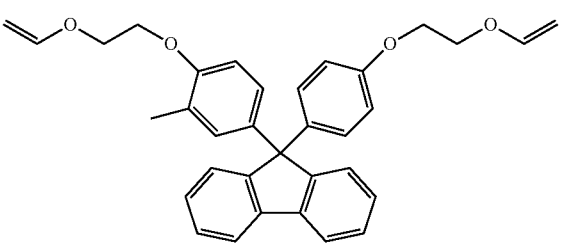
Formula (2)-24
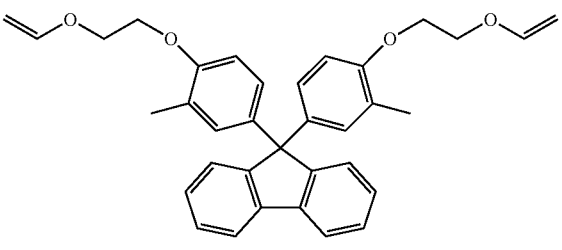
Formula (2)-25
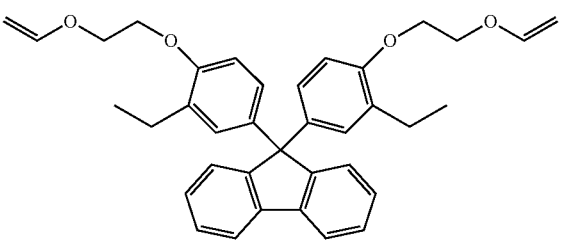
Formula (2)-26
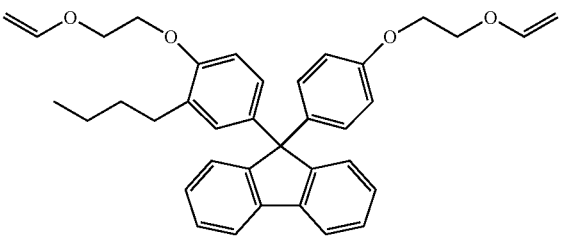

Formula (2)-27
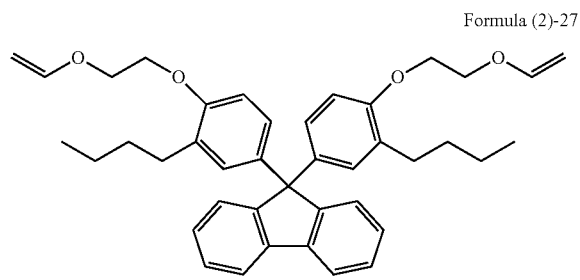
Formula (2)-28
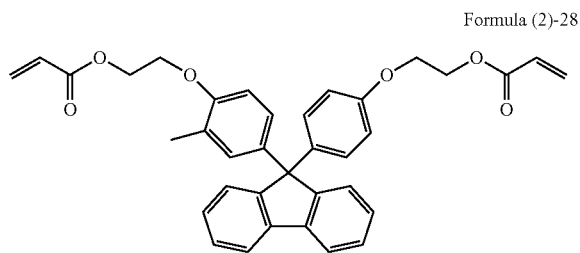
Formula (2)-29
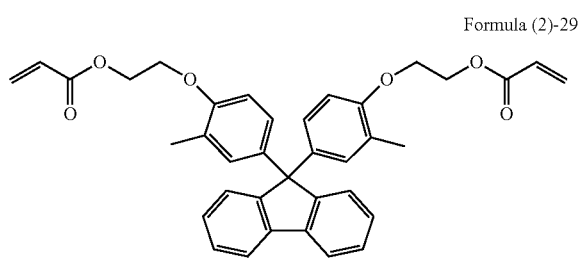
Formula (2)-30
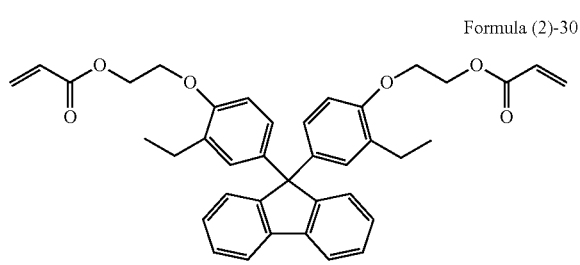
Formula (2)-31
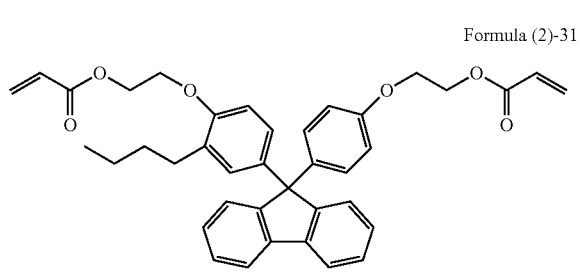
Formula (2)-32
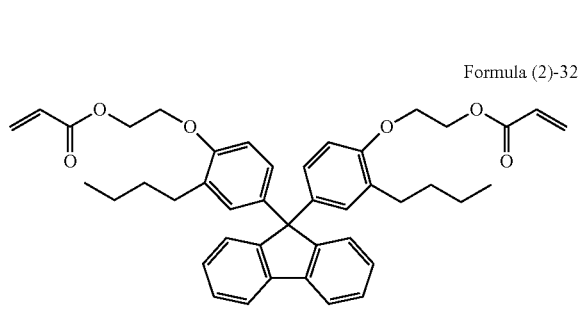
Formula (2)-33
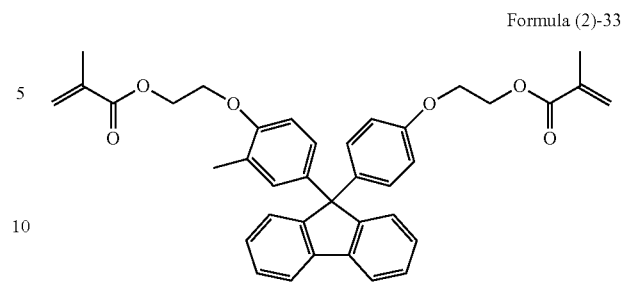
Formula (2)-34
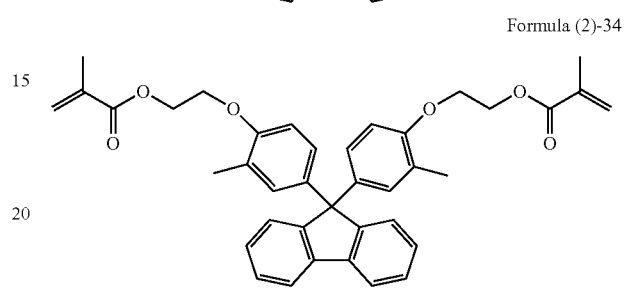
Formula (2)-35
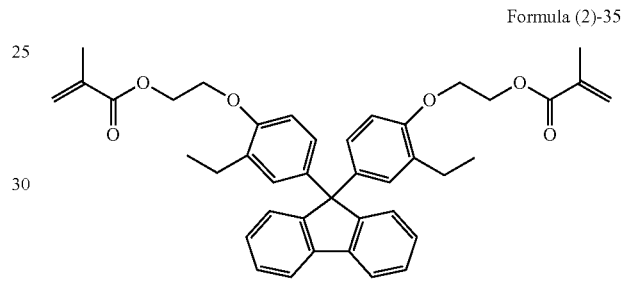
Formula (2)-36
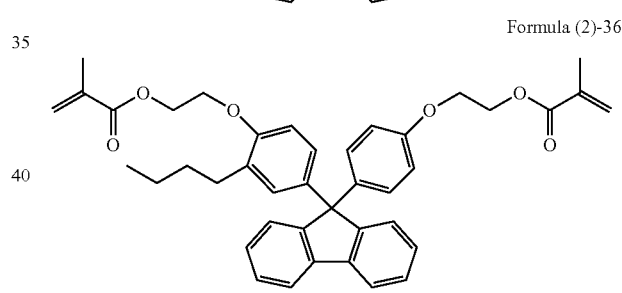
Formula (2)-37
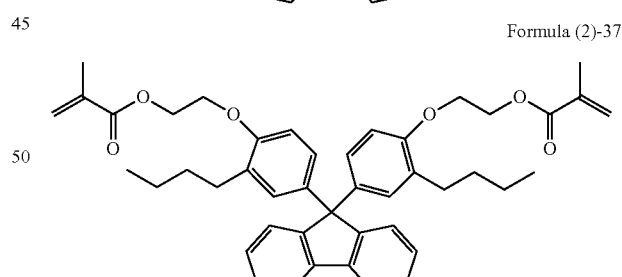
Formula (2)-38
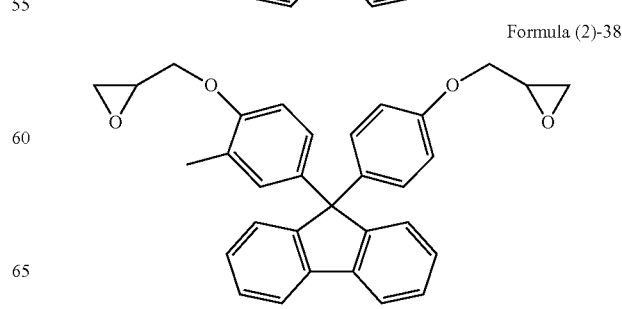

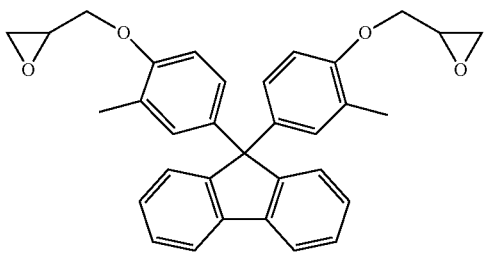

Formula (2)-39

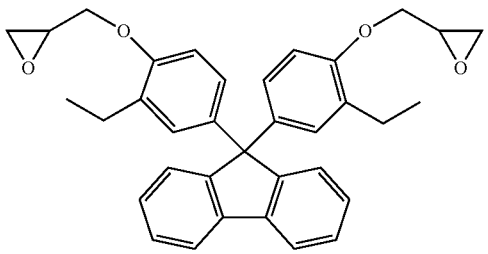

Formula (2)-40

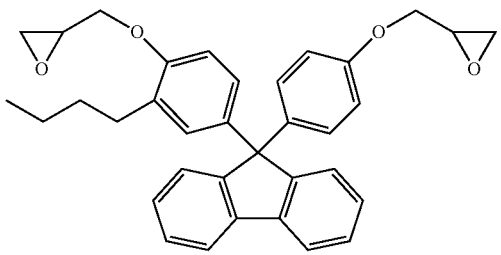

Formula (2)-41

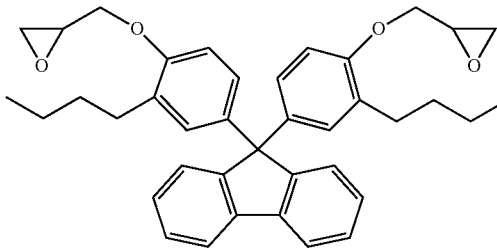

Formula (2)-42

Among the above compounds, more preferred is the compound of the formula (2)-1, (2)-2, (2)-3, (2)-4, (2)-5, (2)-6, (2)-7, (2)-8, (2)-9, (2)-13, (2)-14, (2)-18, (2)-19, (2)-23, (2)-24, (2)-28, (2)-29, (2)-33, (2)-34, (2)-38 or (2)-39.

Further, among the above compounds, particularly preferred is the compound of the formula (2)-1, (2)-2, (2)-3, (2)-4, (2)-5, (2)-6, (2)-7, (2)-9, (2)-14, (2)-19, (2)-24, (2)-29, (2)-34 or (2)-39.

As the fluorene compound represented by the formula (2), two or more types of the above compounds may be used.

In the present invention, the content ratio of the photocurable monomer (A) represented by the formula (1) to the photocurable monomer (B) represented by the formula (2) is such that the weight ratio of the photocurable monomer (A) to the photocurable monomer (B) ((the weight of the photocurable monomer (A))/(the weight of the photocurable monomer (B))) is from 30/70 to 87/13, preferably from 35/65 to 85/15, further preferably from 40/60 to 80/20.

If the content of the photocurable monomer (A) represented by the formula (1) is too low, the refractive index will not be high, the curing tends to be insufficient, the heat resistance will be low, or the viscosity tends to be high and the pattern transfer failure may occur, such being unfavorable. On the other hand, if the content of the photocurable monomer (A) represented by the formula (1) is too high, or if the photocurable monomer (A) alone is used, after the resin composition is applied to a substrate, the photocurable monomer (A) component may be separated, or a thin film cannot be maintained and the resin solution is repelled, whereby no uniform thin film can be obtained, and pattern transfer failure may occur, such being unfavorable.

Further, in the present invention, the shrinkage on curing at the time of curing the resin composition for photoimprinting is usually at most 4.5%, and the resin composition is less deformed at the time of curing. If the shrinkage on curing exceeds 4.5%, the internal stress is likely to remain in the cured product, whereby optical anisotropy may develop, or durability tends to be poor such that the resin composition is separated from the substrate, and the dimension error of the obtainable shape tends to be significant, such being unfavorable. The shrinkage on curing is preferably at most 3.0%, particularly preferably at most 2.5%, whereby the internal stress is less likely to remain.

In the present invention, the shrinkage on curing is obtained from the following formula in accordance with JIS K7112 method B. That is, the shrinkage on curing ($\Delta V$) is calculated by the following formula (1) from the specific gravity ($\rho m$) of the resin composition and the specific gravity ($\rho p$) of its cured product.

Specifically, a resin composition before curing in a state where no solvent is contained, is poured into a graduated cylinder, and the weight of a volume of 10 ml is weighed to obtain a specific gravity ($\rho m$) before curing. The specific gravity ($\rho p$) of the cured product is a value measured by a high precision electronic dense meter SD-120L (manufactured by Mirage Trading Co., Ltd.) with respect to a cast molded product having a length of 50 mm, a width of 10 mm and a thickness of 1 mm.

$$\Delta V(\%) = [(\rho p - \rho m)/\rho p] \times 100 \qquad \text{Formula (1)}$$

Further, in the present invention, a photocurable monomer (H) other than the photocurable monomer (A) may be contained within a range not to impair the object of the present invention.

As the photocurable monomer (H), various monomers may be mentioned. For example, by containing butanediol divinyl ether, octanediol divinyl ether, ethylene glycol divinyl ether, diethylene glycol divinyl ether, triethylene glycol divinyl ether, butanediol diacrylate, octanediol diacrylate, ethylene glycol diacrylate, diethylene glycol diacrylate, triethylene glycol diacrylate, butanediol dimethacrylate, octanediol dimethacrylate, ethylene glycol dimethacrylate, diethylene glycol dimethacrylate, triethylene glycol dimethacrylate, 2-(2-vinyloxyethoxy)ethyl acrylate, 2-(2-vinyloxyethoxy)ethyl methacrylate or the like, flexibility can be imparted. Further, by containing cyclohexylenedimethanol divinyl ether, trimethylolpropane trivinyl ether, cyclohexylene dimethanol diacrylate, trimethylolpropane triacrylate, cyclohexylene dimethanol dimethacrylate, trimethylolpropane trimethacrylate or the like, the crosslink density will be improved, and the surfaces hardness will be improved.

The amount of the photocurable monomer (H) may properly be set within a range not to impair the adhesion of the cured resin to a substrate.

In the present invention, of a cured product obtained from the resin composition for photoimprinting, the refractive index to light having a wavelength of 589 nm is at least 1.58.

If the refractive index of the cured product to a wavelength of 589 nm is low, when the cured product is to be used for a lens or the like, the lens tends to be thick, and molding of an optical element tends to be difficult. The above refractive index is preferably at least 1.60, particularly preferably from 1.62 to 1.70.

The cured product obtained from the resin composition for photoimprinting of the present invention has a high refractive index corresponding to one for an optical element in which inorganic oxide nanoparticles of e.g. $TiO_2$, $Nb_2O_5$ or ITO are dispersed in a resin.

Further, in the present invention, the transmittance of the cured product to a light having a wavelength of 400 nm is at least 80% when the thickness is 20 μm. If the transmittance is less than 80%, violet light will hardly be transmitted and accordingly the cured product looks yellowish, and the light utilization efficiency tends to be low. The transmittance to light is preferably at least 85%, particularly preferably from 88% to 99%.

Further, in the present invention, the glass transition temperature of the cured product is at least 100° C. If the glass transition temperature of the cured product is less than 100° C., the heat resistance tends to be insufficient, and the fine shape of the cured product may not be maintained depending upon the use environment. The glass transition temperature is preferably at least 150° C., particularly preferably from 160 to 230° C.

The resin composition for photoimprinting of the present invention preferably contains a photopolymerization initiator (C).

As the photopolymerization initiator (C), a photoradical polymerization initiator and a photocationic polymerization initiator may be mentioned, and either of them may be used without restriction.

As the photoradical polymerization initiator, for example, a commercially available initiator may be used. Examples thereof include Irgacure (registered trademark) 2959 (1-[4-(2-hydroxyethoxy)phenyl]-2-hydroxy-2-methyl-1-propane-1-one), Irgacure (registered trademark) 184 (1-hydroxycyclohexyl phenyl ketone), Irgacure (registered trademark) 500 (1-hydroxycyclohexyl phenyl ketone, benzophenone), Irgacure (registered trademark) 651 (2,2-dimethoxy-1,2-diphenylethan-1-one), Irgacure (registered trademark) 369 (2-benzyl-2-dimethylamino-1-(4-morpholinophenyl)butanone-1), Irgacure (registered trademark) 907 (2-methyl-1[4-methylthiophenyl]-2-morpholinopropan-1-one), Irgacure (registered trademark) 379 (2-dimethylamino-2-(4-methyl-benzyl)-1-(4-morpholin-4-yl-phenyl)-butan-1-one), Irgacure (registered trademark) 819 (bis(2,4,6-trimethylbenzoyl)-phenylphosphine oxide), Irgacure (registered trademark) 1800 (bis(2,6-dimethoxybenzoyl)-2,4,4-trimethyl-pentylphosphine oxide, 1-hydroxy-cyclohexyl-phenyl-ketone), Irgacure (registered trademark) OXE01 (1,2-octanedione,1[4-(phenylthio)phenyl]-2-(O-benzoyloxime)), Irgacure (registered trademark) OXE02 (ethanone,1-[9-ethyl-6-(2-methylbenzoyl)-9H-carbazol-3-yl]-1-(O-acetyloxime)), Darocur (registered trademark) 1173 (2-hydroxy-2-methyl-1-phenyl-1-propane-1-one), Darocur (registered trademark) 1116, 1398, 1174, 1020, Lucirin TPO (2,4,6-trimethylbenzoyldiphenylphosphine oxide) and Lucirin TPO-L (2,4,6-trimethylbenzoylphenylethoxyphosphine oxide), available from BASF Japan, Ltd., and ESACURE 1001M (1-[4-benzoylphenylsulfanyl]phenyl]-2-methyl-2-(4-methylphenylsulfonyl)propan-1-one available from DKSH Japan. Among them, preferred is Irgacure (registered trademark) 184 (1-hydroxycyclohexyl phenyl ketone), Darocur (registered trademark) 1173 (2-hydroxy-2-methyl-1-phenyl-1-propan-1-one), Lucirin TPO (2,4,6-trimethylbenzoyldiphenylphosphine oxide), Irgacure (registered trademark) 907 (2-methyl-1[4-methylthiophenyl]-2-morpholinopropan-1-one or Irgacure (registered trademark) 379 (2-dimethylamino-2-(4-methyl-benzyl)-1-(4-morpholin-4-yl-phenyl)-butan-1-one).

As the photocationic polymerization initiator, an iodonium salt, a sulfonium salt, a phosphonium salt or the like may be mentioned, and a know one may be used.

Examples of the photocationic polymerization initiator include, bis(alkylphenyl)iodonium hexafluorophosphate, diphenyliodonium hexafluorophosphate, diphenyliodonium hexafluoroantimonate, bis(dodecylphenyl)iodonium tetrakis (pentafluorophenyl)borate, bis[4-(diphenylsulfonio)phenyl] sulfide bishexafluorophosphate, bis[4-(diphenylsulfonio) phenyl]sulfide bishexafluoroantimonate, bis[4-(diphenylsulfonio)phenyl]sulfide bistetrafluoroborate, bis[4-(diphenylsulfonio)phenyl]sulfide tetrakis (pentafluorophenyl)borate, diphenyl-4-(phenylthio) phenylsulfonium hexafluorophosphate, diphenyl-4-(phenylthio)phenylsulfonium hexafluoroantimonate, diphenyl-4-(phenylthio)phenylsulfonium tetrafluoroborate, diphenyl-4-(phenylthio)phenylsulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis[4-(di(4-(2-hydroxyethoxy)) phenylsulfonio)phenyl]sulfide bistetrafluoroborate, and bis [4-(di(4-(2-hydroxyethoxy))phenylsulfonio)phenyl]sulfide tetrakis(pentafluorophenyl)borate. Among them, preferred is bis(alkylphenyl)iodonium hexafluorophosphate or diphenyliodonium hexafluorophosphate.

The above photopolymerization initiators may be used alone or in combination of two or more. Further, considering the dispersibility with the composition, a solvent may be contained.

The content of the photopolymerization initiator (C) in the resin composition for photoimprinting is preferably from 0.01 to 30 parts by weight, more preferably from 0.1 to 20 parts by weight, particularly preferably from 0.2 to 15 parts by weight per 100 parts by weight of the total weight of the photocurable monomer (A) and the photocurable monomer (B).

Further, in order to improve the efficiency of such a photopolymerization initiator and to promote photopolymerization, a known sensitizer or coloring agent may be contained. Particularly a sensitizer is effective to improve the photopolymerization efficiency when a single wavelength light source is used.

The sensitizer may, for example, be anthracene, thioxanthone, benzophenone thioxanthone, phenothiazine or perylene. Among them, an anthracene sensitizer can drastically improve the sensitivity to light when used in combination with a photocationic polymerization initiator. As the anthracene sensitizer, dibutoxyanthracene, dipropoxyanthracene (UVS-1331, UVS-1221 manufactured by KAWASAKI KASEI CHEMICALS LTD.) or the like is effective.

As a sensitizing dye which is a coloring agent, a thiopyrylium salt type dye, a merocyanine type dye, a quinoline type dye, a styrylquinoline type dye, a ketocoumarin type dye, a thioxanthene type dye, a xanthene type dye, an oxonol type dye, a cyanine type dye, a rhodamine type dye or a pyrylium salt type dye may, for example, be mentioned.

The resin composition for photoimprinting of the present invention has a viscosity (at a temperature of from 20 to 50° C.) of preferably from 10 to 2,500,000 mPa·s, particularly preferably from 100 to 2,000,000 mPa·s. In such a case, the resin composition for photoimprinting may contain a viscosity-adjusting agent (D) as the case requires.

The viscosity-adjusting agent (D) is used to adjust the viscosity of the composition when a thin film is to be formed from the composition and to adjust the coating properties of the composition and the thickness of the obtainable thin film. As the viscosity-adjusting agent (D), a known high molecular weight product such as a thermoplastic resin, a thermosetting resin or a liquid resin may be used. Particularly, at least one type of a high molecular weight product having a molecular weight (Mw (weight average molecular weight)) of from 1,000 to 1,000,000, more preferably from 2,000 to 500,000, further preferably from 3,000 to 300,000 is preferably contained. If the molecular weight (Mw) is too low, the effect to adjust the viscosity will not sufficiently be obtained, and the coating property may not be improved, or a change in the coating thickness tends to be small. On the other hand, if the molecular weight (Mw) is too high, the solubility tends to be poor, and insoluble matter may remain, or the change of the viscosity is great even with a small amount, whereby the viscosity is difficult to control. As the viscosity-adjusting agent (D), several types may be used in combination in some cases.

The viscosity-adjusting agent (D) is not particularly limited but is preferably a resin containing an aromatic ring with good miscibility or a resin containing a cyclic structure. For example, an ethylene/methylphenyl norbornene copolymer (for example, disclosed in JP-A-2005-239975), an ethylene/norbornene/methylphenyl norbornene copolymer (for example, disclosed in JP-A-2005-239975), polystyrene, polyacenaphthylene, a tricyclodecane vinyl ether polymer (for example, disclosed in JP-A-2005-113049), a 1-adamantyl vinyl ether polymer, a 2-adamantyl vinyl ether polymer, a methylphenylnorbornane vinyl ether polymer, an ethylene/norbornene copolymer (for example, Topas manufactured by Ticona, Apel manufactured by Mitsui Chemicals, Inc.), a hydrogenated product of a cyclic olefin ring-opening polymer (for example, ZEONEX or ZEONOR manufactured by ZEON CORPORATION), a hydrogenated product of a polar group-containing cyclic olefin ring-opening polymer (for example, ARTON manufactured by JSR Corporation), or a fluorene skeleton-containing polymer may be mentioned.

Further, in order to improve the adhesion to a substrate, as the viscosity-adjusting agent (D), a resin containing hydroxy groups or a resin having hydroxy groups protected may also be properly used. For example, polyhydroxystyrene, a styrene/hydroxystyrene copolymer, an acetal-protected polymer of a styrene/hydroxystyrene copolymer, a hydroxystyrene/tricyclodecane vinyl ether copolymer, an acetal protected product of a hydroxystyrene/tricyclodecane vinyl ether copolymer, or a hydroxystyrene/ethyl vinyl ether block or random copolymer may, for example, be mentioned.

Among the above viscosity-adjusting agents (D), particularly preferred is an ethylene/methylphenyl norbornene copolymer, polystyrene, polyvinyl carbazole, polyacenaphthylene, a tricyclodecane vinyl ether polymer, a 1-adamantyl vinyl ether polymer, a 2-adamantyl vinyl ether polymer, a methylphenylnorbornane vinyl ether polymer, polyhydroxystyrene, a styrene/hydroxystyrene copolymer or its acetal protected product or a fluorene skeleton-containing polymer.

Such viscosity-adjusting agents (D) may be used alone or in combination of two or more. The content of the viscosity-adjusting agent (D) in the resin composition is preferably from 0.1 to 100 parts by weight, more preferably from 0.5 to 50 parts by weight, particularly preferably from 0.5 to 30 parts by weight per 100 parts by weight of the photocurable monomer (A). If the content is too low, no sufficient effect of adjusting the viscosity may be obtained, the coating property may not be improved, or the change in the resin thickness may be small, such being unfavorable. On the other hand, if the content is too high, an insoluble matter may remain, solubility of other components may be decreased, the coating property of the resin may be impaired, or photocuring will hardly occur, such being unfavorable.

In the present invention, production of a cured product particularly a cured thin film in the form of a film or a sheet from the resin composition for photoimprinting is preferably carried out as follows. That is, the resin composition for photoimprinting is applied to a substrate by a known method such as a spin coating method, a solution casting method, a dipping method or a dropping method to form a coating film. The thickness of the coating film may optionally be adjusted by the viscosity adjustment by the viscosity-adjusting agent (D), or by adjustment of the viscosity of the resin composition by dilution with a solvent (G). The film thickness before curing with which favorable film forming property and in-plane uniformity suitable for photoimprinting can be achieved, is preferably from 50 nm to 10 mm, more preferably from 100 nm to 5 mm.

As the support substrate to which the resin composition for photoimprinting is applied, a resin film, a resin sheet or a sheet made of an inorganic material having a thickness of preferably from 0.5 µm to 10 mm is used. As a substrate made of an inorganic material, a substrate at least the surface of which is made of silicon, aluminum, copper, sapphire, $SiO_2$ (silicon oxide), SiC (silicon carbide), GaN (gallium nitride), InGaN (indium gallium nitride), GaAs (gallium arsenide), AlGaAs (aluminum gallium arsenide), AlGaP (aluminum gallium phosphide), ITO (indium tin oxide) or glass may preferably be used. Further, as the substrate made of a resin material, a polyethylene terephthalate (PET) resin, a cyclic olefin resin, a polyolefin resin, an acrylic resin, a polycarbonate resin, a polyvinyl ether resin, a polystyrene resin or the like is preferably used.

In a case where a resin thin film capable of photoimprinting is to be formed, the amount of a remaining volatile component in the thin film is preferably small. If a large amount of a remaining volatile component is present, bubbling or the like may be confirmed on the resin thin film at the time of photoimprinting, whereby the pattern transfer accuracy will be lowered.

For formation of the coating film from the resin composition, preferably a solvent (G) is used. The solvent (G) may optionally be used so long as it dissolves the composition, and preferred is an organic solvent. The organic solvent may, for example, be a ketone solvent, an ester solvent or an aromatic hydrocarbon solvent.

For example, as a ketone solvent, cyclohexanone, cyclopentanone, methyl ethyl ketone, methyl isobutyl ketone or the like may be mentioned.

As an ester solvent, ethylene glycol monomethyl ether acetate, diethylene glycol monomethyl ether monoacetate, diethylene glycol monoethyl ether monoacetate, triethylene glycol monoethyl ether monoacetate, diethylene glycol monobutyl ether monoacetate, propylene glycol monomethyl ether acetate, butylene glycol monomethyl ether acetate or the like may be mentioned.

As an aromatic hydrocarbon solvent, toluene, xylene, mesitylene, chlorobenzene, ethylbenzene, diethylbenzene or the like may be mentioned.

Among them, xylene, cyclohexanone, cyclopentanone or propylene glycol monomethyl ether acetate is preferred.

Such solvents (G) may be used alone or in combination of two or more. When the solvent (G) is added to the resin composition, it may be properly heated to dissolve the resin. The solvent (G) may optionally be prepared depending upon the thickness of the thin film to be formed. The solvent (G) with which favorable film forming property and in-plane uniformity suitable for photoimprinting can be achieved is contained in an amount of preferably from 0.5 to 30,000 parts by weight, more preferably from 1.0 to 25,000 parts by weight per 100 parts by weight of the total weight of the photocurable monomer (A) and the photocurable monomer (B). If the solvent content is too low, the viscosity tends to be high, the resin will hardly be uniformly spread, and no uniform film thickness may be obtained in some cases, such being unfavorable. On the other hand, if the solvent content is too high, the film tends to be too thin, the surface area is relatively large to the volume, and the film state may not be maintained by the surface tension, or the solvent is likely to remain in the resin, such being unfavorable.

By film formation by the spin coating method, the solvent evaporation rate will be improved by the airflow by high speed revolution, and the solvent can be evaporated during spin coating, whereby a resin thin film with a small amount of the remaining volatile component applicable to photoimprinting will be obtained. The boiling point of the solvent to be used for spin coating is preferably from 70° C. to 250° C., more preferably from 80 to 240° C., particularly preferably from 90 to 220° C. in order to secure the in-plane uniformity of the film formed by spin coating. A solvent having a boiling point lower than the boiling point of the photocurable monomer (A) to be used may suitably be used.

Further, in order to further reduce the remaining volatile component in the thin film, after spin coating, drying by heating may be carried out e.g. by a hotplate, a hot air dryer or a vacuum dryer, to obtain a thin film of the resin for photoimprinting. In such a case, the hot air drying temperature is preferably lower than the boiling point of the photocurable monomer (A) to be used.

On the other hand, by the solution casting method, the dipping method, the dropping method or the like, it tends to be difficult to evaporate the solvent at the time of coating, and accordingly if a solvent is used, air drying or thermal drying step after coating will be required. As a film thickness with which the remaining volatile component in the thin film can be reduced, the thickness of the thin film to be formed is more preferably at most 40 µm, particularly preferably at most 35 um before curing.

In a case where the thin film is formed from the resin composition for photoimprinting, a leveling agent may be blended. As the leveling agent, known one may be used, and preferred is a silicone type compound, a fluorine type compound, an acrylic type compound, or an acrylic/silicone type compound.

The silicone type compound may, for example, be DISPARLON 1761 or DISPARLON 1711EF manufactured by Kusumoto Chemicals, Ltd.

The fluorine type compound may, for example, be MEGAFAC F-470 or F-471 manufactured by Dainippon Ink and Chemicals.

The acrylic type compound may, for example, be DISPARLON LF-1980 or LF-1982, and the acrylic/silicone type compound may, for example, be DISPARLON UVX-270 or UVX-271.

The amount of addition of the leveling agent is selected within a range not to impair the optical properties and the adhesion to a substrate.

Further, in the resin composition, as the case requires, additives such as an antifoaming agent, an antioxidant, a heat-resistant stabilizer, a weather-resistant stabilizer, a light stabilizer and the like may be incorporated. Further, as an adhesion-imparting agent to improve the adhesion to a substrate, a compound having a hydroxy group such as bisphenol A, hydrogenated bisphenol A, 1-adamantyl alcohol, 2-adamantyl alcohol or tricyclodecanol may be incorporated. The blend amount of the additives is within a range not to impair the function of the resin composition such as optical properties, and a known compound may be suitably used.

In a case where a thin film is to be formed from the resin composition, particularly in the case of application to photoimprinting, the resin composition may be used as it is, however, it is preferably subjected to filtration using a known method so as to remove particulate matter by foreign matters from the viewpoint of improvement in the transfer accuracy. It is possible to properly change the material of the filter depending upon the type of the resin composition to be used. Further, a filter having no charge trapping function may also be suitably used. The filter pore size is particularly preferably at most 0.45 µm.

The coating film of the resin composition is cured by irradiation with e.g. ultraviolet light having a wavelength of preferably from 180 to 450 nm, particularly preferably from 200 to 400 nm. The irradiation conditions may properly be changed depending upon the type and the compositional ratio of the resin composition, the film thickness and the like. As the wavelength of the ultraviolet light to be applied, a light source having a wavelength with a high sensitivity may properly be selected depending upon the type of the photopolymerization initiator and the sensitizer, and the like.

The ultraviolet light irradiation light source may, for example, be a high pressure mercury lamp, an ultrahigh pressure mercury lamp, a xenon lamp, a metal halide lamp, an LED lamp, solar light, or a carbon arc lamp. Further, as the active energy ray, in addition to ultraviolet light, for example, visible light, infrared light, X-ray, α-ray, β-ray, γ-ray or electron beam may be used.

During irradiation with active energy ray such as ultraviolet light, or after release from the mold after irradiation, the resin may be heated as the case requires. By heating, unreacted products in the cured resin can be reduced, and the curing property of the resin and the adhesion to a supporting substrate can be improved. The heating temperature is usually preferably from 30 to 100° C., and is more preferably lower than the resin glass transition temperature after curing. Further, post-ultraviolet curing is also applicable, comprising further irradiating the cured film after irradiated with ultraviolet light and released from the mold, with ultraviolet light thereby to increase the resin cure extent. The film thickness of the cured film is preferably from 50 nm to 10 mm, particularly preferably from 100 nm to 5 mm.

If the film thickness is less than 50 nm, the surface area is relatively large to the volume, whereby the film state cannot be maintained by the surface tension in some cases, such being unfavorable. On the other hand, if the film thickness exceeds 10 mm, light is less likely to reach the interior, and the internal curing property may be insufficient in some cases, such being unfavorable.

In the present invention, with the optical material element, a fine structure can be formed on a substrate by a known photoimprinting method.

The pattern forming process of the present invention in the photoimprinting method preferably comprises the following steps.

(1) A step of applying the resin composition to a substrate to form a coating film, (2) A step of bringing a pattern surface of a mold having a desired pattern into contact with the surface of the formed coating film and pressurizing them to fill the space in the pattern with the resin composition, (3) A step of curing the resin composition in the space in the pattern by light irradiation, and (4) A step of separating the mold from the cured resin composition.

As an apparatus to carry out photoimprinting, various apparatus is available on the market, and a proper apparatus can be selected. In order to realize a process with excellent pattern transfer accuracy and with improved productivity, imprinting conditions under which the mold pressure is low and the mold time is short are preferred.

Further, in a case where a mold is brought into contact with the resin surface in the air, depending upon the pattern size, the shape or the resin viscosity, pattern defects by inclusion of air bubbles may occur. Further, moisture or oxygen in the air may inhibit the photopolymerization, thus leading to insufficient curing of the resin in some cases. Accordingly, as the case requires, a photoimprinting method under reduced pressure may also be applicable in which the pressure in the apparatus system is reduced, and under reduced pressure, the mold is brought into contact with the resin surface and they are pressurized to photocure the resin. Further, the atmosphere in the apparatus system may be replaced with an inert gas, dry air or another gas which will not inhibit curing of the resin, to carry out photoimprinting.

In the present invention, an optical element material comprising the cured product of the resin composition can be used, for example, as a lens such as a lens and a finder for a still camera, a lens for a video camera, a laser pickup lens, a fθ lens for a laser printer, a cylindrical lens and a polygon mirror, a lens for a projection TV, a multilens for a liquid crystal projector, a relay lens, a condenser lens, a projection lens and a Fresnel lens, or an eyeglass lens; a member for a liquid crystal element such as a disk substrate for a compact disk (such as a CD or a CD-ROM), a MiniDisc or a DVD, a substrate for a LCD, a polarizing film transparent resin sheet, a phase difference film, a light diffusing film or an adhesive for liquid crystal element bonding; a screen for a projector, an optical filter, a lenticular sheet, a condensing film, a member for a microlens, a member for a wafer level lens or a lens for a photoelectric conversion element.

Further, the optical element material of the present invention is used, in view of the shrinkage on curing, the refractive index and the transmittance, as an optical element such as a pickup lens (such as an objective lens, a diffraction grating or a collimator lens) for a MiniDisc or a pickup lens (such as an objective lens, a diffraction grating or a collimator lens) for a DVD, particularly an optical element to be used for an optical system using blue laser having a wavelength of from 380 to 420 nm. Further, it is used for a lens for a photoelectric conversion element. Particularly it is suitable for an application to a pickup lens or a lens for a photoelectric conversion element, particularly a non-objective lens such as a diffraction grating or a collimator lens or a lens for a photoelectric conversion element.

Further, the optical element material of the present invention is used, in view of the shrinkage on curing and the heat resistance, as an optical element such as a substrate for a LCD, a polarizing film transparent resin sheet, a phase difference film, a light diffusing film, a member for a liquid crystal element such as an adhesive for liquid crystal element bonding, a screen for a projector, an optical filter, optical fibers, a prism, a lenticular sheet, a condensing film, a wafer level lens or a microlens. Particularly, it is optimum as a polarizing film transparent resin sheet, a phase difference film, a light diffusing film, a member for a liquid crystal element such as an adhesive for liquid crystal element bonding, a lenticular sheet, a condensing film, a wafer level lens or a microlens.

EXAMPLES

Now, the present invention will be described with reference to Examples. However, the present invention is by no means restricted to such specific Examples.

A: Methods for Preparation of Resin Composition for Photoimprinting and Viscosity Measurement Examples 1 to 10 and Comparative Examples 1 to 5

Each of resin compositions for photoimprinting in Examples 1 to 10 and Comparative Examples 1 to 5 was prepared by using, as identified in Table 1 or 2, a photocurable monomer (A), a photocurable monomer (B), a photopolymerization initiator (C), a viscosity-adjusting agent (D), a sensitizer (E), a leveling agent (F), a solvent (G) and a photocurable monomer (H).

In Tables 1 and 2, the values for the photopolymerization initiator (C), the viscosity-adjusting agent (D), the sensitizer (E), the leveling agent (F) and the solvent (G) are contents (parts by weight) per 100 parts by weight of the total amount of the photocurable monomer (A) and the photocurable monomer (B).

Preparation of the respective compositions and the viscosity measurement were carried out by the following procedure in a yellow room under fluorescent light in which ultraviolet light having a wavelength of at most 500 nm was shut out.

1. In a predetermined glass container, the photocurable monomer (A), the photocurable monomer (B), the photocurable monomer (H) and the photopolymerization initiator (C), and as the case requires, the viscosity-adjusting agent (D), the sensitizer (E), the leveling agent (F) and solvent (G) were weighed in a proportion as identified in Table 1 or 2, stirred and mixed.

2. The mixture was filtrated through a nylon filter (manufactured by Sumitomo 3M Limited, tradename: LifeASSURE) having a pore size of 0.45 μm to prepare a resin composition for photoimprinting.

The respective components disclosed in Tables 1 and 2 are shown below. In Table 3, the classification, the abbreviation and the name of each component are shown.

(1) Photocurable Monomer (A)

A-1: N-Vinylcarbazole (manufactured by Maruzen Petrochemical Co., Ltd.)

(2) Photocurable Monomer (B)

B-1: 9,9-bis[4-(2-acryloyloxyethoxy)phenyl]fluorene (manufactured by SHIN-NAKAMURA CHEMICAL CO., LTD., product name: A-BPEF)

B-2: 9,9-bis[4-(2-vinyl ether ethoxy)phenyl]fluorene (manufactured by Maruzen Petrochemical Co., Ltd.)

B-3: Bisarylfluorene compound (manufactured by Osaka Gas Chemicals Co., Ltd., product name: OGSOL PG-100)

B-4: Bisarylfluorene compound (manufactured by Osaka Gas Chemicals Co., Ltd., product name: OGSOL CG-500)

(3) Photopolymerization Initiator (C)

C-1: 1-Hydroxy-cyclohexyl-phenyl-ketone (manufactured by BASF Japan, Ltd., Irgacure 184)

C-2: 2-Dimethylamino-2-(4-methyl-benzyl)-1-(4-morpholin-4-yl-phenyl)-butan-1-one (manufactured by BASF Japan, Ltd., Irgacure 379)

C-3: 50 wt % propylene carbonate solution of bis(alkylphenyl)iodonium hexafluorophosphate (manufactured by Wako Pure Chemical Industries, Ltd., WPI-113)

C-4: 2,2-Dimethoxy-1,2-diphenylethan-1-one (manufactured by BASF Japan, Ltd., Irgacure 651)

C-5: CPI-210S manufactured by San-Apro Ltd.

(4) Viscosity-Adjusting Agent (D)

The weight average molecular weight (Mw) of the resin D-1 used for the viscosity-adjusting agent (D) was measured by gel permeation chromatography (GPC) using a GPC apparatus manufactured by Waters under conditions of column: Shodex K-805L/K-806L, column temperature: 40° C., solvent: chloroform and flow rate: 0.8 mL/min. The weight average molecular weight (Mw) of resin D-2 used for the viscosity-adjusting agent (D) was measured by using a GPC apparatus manufactured by TOSOH CORPORATION under conditions of column: TSK G2000H×two columns/TSK G3000H/TSK G4000H manufactured by TOSOH CORPORATION, column temperature: 40° C., solvent: THF and flow rater 1.0 mL/min.

D-1: Ethylene/5-methyl-5-phenyl-bicyclo[2,2,1]hept-2-ene copolymer (Mw: 50,000, ethylene/methylphenyl norbornene copolymer disclosed in JP-A-2005-239975)

D-2: Poly(9-vinylcarbazole) (reagent manufactured by Sigma-Aldrich, Mn (number average molecular weight): 25,000 to 50,000, Mw/Mn: about 2)

(5) Sensitizer (E)

E-1: 9,10-Dipropoxyanthracene (manufactured by KAWASAKI KASEI CHEMICALS LTD., UVS-1221)

(6) Leveling Agent (F)

F-1: Silicone type leveling agent (manufactured by Kusumoto Chemicals, Ltd., DISPARLON 1761)

(7) Solvent (G)

G-1: Cyclohexanone (manufactured by Wako Pure Chemical Industries, Ltd.)

(8) Photocurable Monomer (H)

H-1: Tripropylene glycol diacrylate (manufactured by SHIN-NAKAMURA CHEMICAL CO., LTD., product name: APG-200)

H-2: Trimethylolpropane triacrylate (manufactured by SHIN-NAKAMURA CHEMICAL CO., LTD., product name: A-TMPT)

H-3: N-vinyl-2-pyrrolidone (manufactured by Wako Pure Chemical Industries, Ltd.)

H-4: 2-Phenoxyethyl acrylate (manufactured by SARTOMER JAPAN INC., product name: SR339A)

B: Preparation of Cast Molded Product

Each of the resin compositions for photoimprinting in Examples 1 to 10 and Comparative Examples 2 to 5 prepared by the above method was cast into a mold having a length of 50 mm, a width of 10 mm and a thickness of 1 mm. After each of the resin compositions for photoimprinting in Examples 1 to 10 and Comparative Examples 3 to 5 was cast into the mold having a length of 50 mm, a width of 10 mm and a thickness of 1 mm, the solvent was removed by a vacuum dryer to achieve a state without solvent. The resin composition for photoimprinting in Comparative Example 2, which contained no solvent, was used as it was.

Among the resin compositions on the mold prepared as above, the resin compositions in Examples 1 to 7 and Comparative Examples 2 to 5 were irradiated with UV in a nitrogen atmosphere, and the resin compositions in Examples 8 to 10 were irradiated with UV in dry air with a relative humidity of at most 2.0%.

Each resin composition was irradiated with ultraviolet light using as a UV light source a high pressure mercury lamp (represented as Hg in Tables 1 and 2) with an irradiation intensity of 50 mW/cm$^2$ with a UV irradiation amount as identified in Tables 1 and 2 to cure the resin.

C: Methods for Application and Curing of Resin Composition

C-1: Resin Thin Film for Measurement of Refractive Index and Abbe Number

The resin compositions in Examples and Comparative Examples and the resin solution were applied by the following spin coating method.

As a substrate, a Si wafer (manufactured by ELECTRONICS AND MATERIALS CORPORATION LIMITED, plane direction: 1.0.0) having a diameter of 2 inches which was stored in a dry chamber under a relative humidity of at most 25% for at least 24 hours, was used.

In Examples 1 to 10 and Comparative Examples 2 to 5, the Si wafer having a diameter of 2 inches was placed on a spin coater (manufactured by EHC, SC-308H) and fixed by vacuum contact. Then, 0.4 ml of the resin composition or the resin solution was placed around the center of the substrate, followed by spin coating under spin coating conditions as identified in Table 1 or 2, to prepare a thin film of the resin for photoimprinting.

Among the resin thin films prepared as above, the resin thin films in Examples 1 to 7 and Comparative Examples 2 to 5 were irradiated with UV in a nitrogen atmosphere, and the resin thin films in Examples 8 to 10 were irradiator with UV in dry air with a relative humidity of at most 2.0%.

Each resin thin film was irradiated with ultraviolet light using as a UV light source a high pressure mercury lamp (represented as "Hg" in Tables 1 and 2) with an irradiation intensity of 50 mW/cm$^2$ with a UV irradiation amount as identified in Table 1 or 2 to cure the resin.

C-2: Resin Thin Film (20 μm Thickness) for Measurement of Transmittance

From each of the resin compositions for photoimprinting in Examples 1 to 10 and Comparative Examples 3 to 5, the solvent was removed by a vacuum dryer to achieve a state without solvent. The resin composition in Comparative Example 2, which contained no solvent, was used as it was. Each resin composition was applied in a 20 μm thickness to a quartz substrate having a diameter of 2 inches by a bar coater.

Among the resin thin films prepared as above, the resin thin films in Examples 1 to 7 and Comparative Examples 2 to 5 were irradiated with UV in a nitrogen atmosphere, and the resin thin films in Examples 8 to 10 were irradiated with UV in dry air with a relative humidity of at most 2.0%.

Each resin thin film was irradiated with ultraviolet light using as a UV light source a high pressure mercury lamp (represented as "Hg" in Tables 1 and 2) in Examples 1 to 10 and Comparative Examples 2 to 5, with an irradiation intensity of 50 mW/cm$^2$ with a UV irradiation amount as identified in Table 1 or 2 to cure the resin.

D: Evaluation of Cast-Molded Product and Resin Thin Film
    (Shrinkage on Curing)

The shrinkage on curing is obtained by the following formula in accordance with JIS K7112 method B. The shrinkage on curing (ΔV) was calculated by the following formula (1) from the specific gravity (ρm) of the resin composition and the specific gravity (ρp) of its cured product.

$$\Delta V(\%) = [(\rho p - \rho m)/\rho p] \times 100 \quad \text{Formula (1)}$$

From each of the resin compositions for photoimprinting in Examples 1 to 10 and Comparative Examples 3 to 5, the solvent was removed by a vacuum dryer to achieve a state without solvent. The resin composition in Comparative Example 2 was used as it was. Each of the resin composition before curing in a state without solvent and the resin composition before curing in Comparative Example 2 was poured into a graduated cylinder, and the weight of a volume of 10 ml was weighed to obtain a specific gravity (ρm) before curing. The specific gravity (ρp) of the cured product was a value measured by a high precision electronic dense meter SD-120L (manufactured by Mirage Trading Co., Ltd.) with respect to a cast molded product having a length of 50 mm, a width of 10 mm and a thickness of 1 mm obtained by curing by the above method for preparation of cast molded product.

(Glass Transition Temperature (Tg))

The glass transition temperature (Tg) was obtained from an endothermic peak when the cast molded product was heated, using a differential scanning calorimeter (manufactured by Seiko Instruments & Electronics Ltd., EXSTAR6000 and DSC6200).

(Refractive Index and Abbe Number)

The refractive index and the Abbe number of each of the resin thin films prepared from the resin compositions were measured. The results are shown in Tables 1 and 2. In each of Examples 1 to 10 and Comparative Examples 2 to 5, using the thin film formed on the Si wafer having a diameter of 2 inches, the refractive index of the cured resin was measured by a reflective film thickness monitor (manufactured by Otsuka Electronics Co., Ltd., FE-3000). Specifically, the refractive index was measured within a range of from 300 to 800 nm, and the optical constant was calculated by the least squares method using Cauchy's dispersion formula as the approximate expression of the wavelength dispersion of the refractive index, to measure the refractive index. Further, the refractive index was evaluated as the refractive index at a wavelength of 589 nm. The Abbe number vD was determined from the refractive index at each wavelength using the following formula (2).

$$vD = (nD - 1)/(nF - nC) \quad (2)$$

In the above formula (2), nD: the refractive index of light having a wavelength of 589 nm, nF: the refractive index of light having a wavelength of 486 nm, nC: the refractive index of light having a wavelength of 656 nm.

From the results shown in Tables 1 and 2, the refractive index of each of the cured products obtained from the resin compositions for photoimprinting was confirmed to be higher than the refractive index of the UV-cured resin as a Comparative Example.

(Transmittance)

Using the 20 μm cured film formed on the 2 inches quartz substrate in each of Examples 1 to 10 and Comparative Examples 2 to 5, the transmittance to light having a wavelength of 400 nm was measured by an ultraviolet visible near infrared spectrophotometer (manufactured by JASCO Corporation, V-570).

As shown in Table 2, each of the resin compositions for photoimprinting in Comparative Examples, i.e. compositions in which the proportions of the photocurable monomer (A) and the photocurable monomer (B) are out of those of the present invention, had a high shrinkage on curing, had a low refractive index, had a low heat resistance, or was solid at room temperature, and was inferior in the moldability.

TABLE 1

|  | Ex. 1 | | Ex. 2 | | Ex. 3 | | Ex. 4 | |
| --- | --- | --- | --- | --- | --- | --- | --- | --- |
|  | Type | Amount | Type | Amount | Type | Amount | Type | Amount |
| Photocurable monomer (A) | A-1 | 50 | A-1 | 50 | A-1 | 70 | A-1 | 85 |
| Photocurable monomer (B) | B-1 | 50 | B-1 | 50 | B-1 | 30 | B-1 | 15 |
| Photocurable monomer (H) |  |  |  |  |  |  |  |  |
| Photopolymerization initiator (C) | C-2 | 5 | C-1 | 4 | C-1 | 4 | C-1 | 4 |
| Viscosity-adjusting agent (D) |  |  |  |  | D-2 | 11.5 | D-2 | 11.5 |
| Sensitizer (E) |  |  |  |  |  |  |  |  |
| Leveling agent (F) |  |  |  |  |  |  |  |  |
| Solvent (G) | G-1 | 348 | G-1 | 348 | G-1 | 408 | G-1 | 366 |
| Type of substrate | 2 inch Si wafer | | 2 inch Si wafer | | 2 inch Si wafer | | 2 inch Si wafer | |
| Spin coating conditions | 400 rpm × 5 sec Slope 3.5 sec 4500 rpm × 20 sec | | 400 rpm × 5 sec Slope 3.5 sec 4500 rpm × 20 sec | | 400 rpm × 5 sec Slope 3.5 sec 4500 rpm × 20 sec | | 400 rpm × 5 sec Slope 3.5 sec 4500 rpm × 20 sec | |
| Film thickness | 531 nm | | 531 nm | | 529 nm | | 514 nm | |
| UV light source | Hg | | Hg | | Hg | | Hg | |
| UV irradiation amount | 3000 mJ | | 3000 mJ | | 3000 mJ | | 3000 mJ | |
| Glass transition temperature (Tg) | 188° C. | | 188° C. | | 190° C. | | 195° C. | |
| Refractive index (589 nm) | 1.665 | | 1.666 | | 1.669 | | 1.671 | |
| Abbe number | 19.2 | | 19.2 | | 18.1 | | 17.9 | |
| Transmittance (400 nm) 20 μm thickness cured film | 89.4% | | 96.0% | | 94.7% | | 95.7% | |
| Specific gravity before curing (without solvent) | 1.187 g/cm$^3$ | | 1.187 g/cm$^3$ | | 1.141 g/cm$^3$ | | 1.133 g/cm$^3$ | |
| Specific gravity after curing | 1.210 g/cm$^3$ | | 1.212 g/cm$^3$ | | 1.182 g/cm$^3$ | | 1.185 g/cm$^3$ | |
| Shrinkage on curing | 1.9% | | 2.1% | | 3.5% | | 4.4% | |

TABLE 1-continued

|  | Ex. 5 | | Ex. 6 | | Ex. 7 | | Ex. 8 | |
| --- | --- | --- | --- | --- | --- | --- | --- | --- |
|  | Type | Amount | Type | Amount | Type | Amount | Type | Amount |
| Photocurable monomer (A) | A-1 | 30 | A-1 | 30 | A-1 | 30 | A-1 | 50 |
| Photocurable monomer (B) | B-1 | 70 | B-1 | 70 | B-1 | 70 | B-2 | 50 |
| Photocurable monomer (H) | | | H-3 | 10 | H-4 | 15 | | |
| Photopolymerization initiator (C) | C-1 | 4 | C-1 | 4 | C-1 | 4 | C-3 | 5 |
| Viscosity-adjusting agent (D) | | | | | | | D-1 | 1 |
| Sensitizer (E) | | | | | | | E-1 | 1.5 |
| Leveling agent (F) | | | | | | | F-1 | 2.5 |
| Solvent (G) | G-1 | 366 | G-1 | 333 | G-1 | 390 | G-1 | 368 |
| Type of substrate | 2 inch Si wafer | | 2 inch Si wafer | | 2 inch Si wafer | | 2 inch Si wafer | |
| Spin coating conditions | 400 rpm × 5 sec Slope 3.5 sec 4500 rpm × 20 sec | | 400 rpm × 5 sec Slope 3.5 sec 4500 rpm × 20 sec | | 400 rpm × 5 sec Slope 3.5 sec 4500 rpm × 20 sec | | 400 rpm × 5 sec Slope 3.5 sec 4500 rpm × 20 sec | |
| Film thickness | 534 nm | | 546 nm | | 542 nm | | 498 nm | |
| UV light source | Hg | | Hg | | Hg | | Hg | |
| UV irradiation amount | 3000 mJ | | 3000 mJ | | 3000 mJ | | 3000 mJ | |
| Glass transition temperature (Tg) | 183° C. | | 168° C. | | 164° C. | | 185° C. | |
| Refractive index (589 nm) | 1.645 | | 1.644 | | 1.635 | | 1.662 | |
| Abbe number | 21.1 | | 19.0 | | 22.2 | | 19.5 | |
| Transmittance (400 nm) 20 μm thickness cured film | 96.8% | | 97.0% | | 95.5% | | 91.5% | |
| Specific gravity before curing (without solvent) | 1.193 g/cm$^3$ | | 1.170 g/cm$^3$ | | 1.170 g/cm$^3$ | | 1.180 g/cm$^3$ | |
| Specific gravity after curing | 1.212 g/cm$^3$ | | 1.218 g/cm$^3$ | | 1.225 g/cm$^3$ | | 1.214 g/cm$^3$ | |
| Shrinkage on curing | 1.6% | | 3.9% | | 4.5% | | 2.8% | |

|  | Ex. 9 | | Ex. 10 | |
| --- | --- | --- | --- | --- |
|  | Type | Amount | Type | Amount |
| Photocurable monomer (A) | A-1 | 50 | A-1 | 50 |
| Photocurable monomer (B) | B-3 | 50 | B-4 | 50 |
| Photocurable monomer (H) | | | | |
| Photopolymerization initiator (C) | C-5 | 5 | C-5 | 5 |
| Viscosity-adjusting agent (D) | | | | |
| Sensitizer (E) | | | | |
| Leveling agent (F) | | | | |
| Solvent (G) | G-1 | 333 | G-1 | 360 |
| Type of substrate | 2 inch Si wafer | | 2 inch Si wafer | |
| Spin coating conditions | 400 rpm × 5 sec Slope 3.5 sec 4500 rpm × 20 sec | | 400 rpm × 5 sec Slope 3.5 sec 4500 rpm × 20 sec | |
| Film thickness | 535 nm | | 472 nm | |
| UV light source | Hg | | Hg | |
| UV irradiation amount | 3000 mJ | | 3000 mJ | |
| Glass transition temperature (Tg) | 190° C. | | 195° C. | |
| Refractive index (589 nm) | 1.662 | | 1.696 | |
| Abbe number | 20.1 | | 18.7 | |
| Transmittance (400 nm) 20 μm thickness cured film | 88.2% | | 90.7% | |
| Specific gravity before curing (without solvent) | 1.154 g/cm$^3$ | | 1.200 g/cm$^3$ | |
| Specific gravity after curing | 1.205 g/cm$^3$ | | 1.220 g/cm$^3$ | |
| Shrinkage on curing | 4.2% | | 1.6% | |

TABLE 2-1

|  | Comp. Ex. 1 | | Comp. Ex. 2 | | Comp. Ex. 3 | |
| --- | --- | --- | --- | --- | --- | --- |
|  | Type | Amount | Type | Amount | Type | Amount |
| Photocurable monomer (A) | A-1 | 90 | | | A-1 | 20 |
| Photocurable monomer (B) | B-1 | 10 | | | B-1 | 80 |
| Photocurable monomer (B) | | | | | | |
| Photocurable monomer (H) | | | H-1 | 59 | | |
| Photocurable monomer (H) | | | H-2 | 11 | | |
| Photocurable monomer (H) | | | H-3 | 30 | | |

TABLE 2-1-continued

| | | | | | | |
|---|---|---|---|---|---|---|
| Photopolymerization initiator (C) | C-2 | 10 | C-4 | 10 | C-1 | 4 |
| Viscosity-adjusting agent (D) | | | | | | |
| Sensitizer (E) | | | | | | |
| Leveling agent (F) | | | F-1 | 1 | | |
| Solvent (G) | G-1 | 313 | | | G-1 | 416 |
| Type of substrate | 2 inch Si wafer | | 2 inch Si wafer | | 2 inch Si wafer | |
| Spin coating conditions | 400 rpm × 5 sec Slope 3.5 sec 4500 rpm × 20 sec | | 400 rpm × 5 sec Slope 3.5 sec 4500 rpm × 20 sec | | 400 rpm × 5 sec Slope 3.5 sec 4500 rpm × 20 sec | |
| Film thickness | Solid content precipitated, impossible to prepare cured film | | 980 nm | | 478 nm | |
| UV light source | | | Hg | | Hg | |
| UV irradiation amount | | | 3000 mJ | | 3000 mJ | |
| Glass transition temperature (Tg) | | | 56° C. | | 97° C. | |
| Refractive index (589 nm) | | | 1.511 | | 1.635 | |
| Abbe number | | | 51.7 | | 22.4 | |
| Transmittance (400 nm) 20 μm thickness cured film | | | 92.5% | | 97.1% | |
| Specific gravity before curing (without solvent) | | | 1.056 g/cm$^3$ | | 1.196 g/cm$^3$ | |
| Specific gravity after curing | | | 1.175 g/cm$^3$ | | 1.213 g/cm$^3$ | |
| Shrinkage on curing | | | 10.1% | | 1.4% | |

| | Comp. Ex. 4 | | Comp. Ex. 5 | |
|---|---|---|---|---|
| | Type | Amount | Type | Amount |
| Photocurable monomer (A) | A-1 | 10 | | |
| Photocurable monomer (B) | B-1 | 90 | B-1 | 50 |
| Photocurable monomer (B) | | | | |
| Photocurable monomer (H) | | | H-2 | 50 |
| Photocurable monomer (H) | | | | |
| Photocurable monomer (H) | | | | |
| Photopolymerization initiator (C) | C-1 | 4 | C-1 | 4 |
| Viscosity-adjusting agent (D) | | | | |
| Sensitizer (E) | | | | |
| Leveling agent (F) | | | | |
| Solvent (G) | G-1 | 508 | G-1 | 329 |
| Type of substrate | 2 inch Si wafer | | 2 inch Si wafer | |
| Spin coating conditions | 400 rpm × 5 sec Slope 3.5 sec 4500 rpm × 20 sec | | 400 rpm × 5 sec Slope 3.5 sec 4500 rpm × 20 sec | |
| Film thickness | 508 nm | | 537 nm | |
| UV light source | Hg | | Hg | |
| UV irradiation amount | 3000 mJ | | 3000 mJ | |
| Glass transition temperature (Tg) | 68° C. | | 68° C. | |
| Refractive index (589 nm) | 1.619 | | 1.570 | |
| Abbe number | 23.9 | | 33.5 | |
| Transmittance (400 nm) 20 μm thickness cured film | 96.9% | | 96.4% | |
| Specific gravity before curing (without solvent) | 1.198 g/cm$^3$ | | 1.147 g/cm$^3$ | |
| Specific gravity after curing | 1.213 g/cm$^3$ | | 1.235 g/cm$^3$ | |
| Shrinkage on curing | 1.2% | | 7.1% | |

TABLE 3

| | | Name |
|---|---|---|
| Photocurable monomer (A) | A-1 | N-vinylcarbazole (manufactured by Maruzen Petrochemical Co., Ltd.) |
| Photocurable monomer (B) | B-1 | 9,9-bis[4-(2-acryloyloxyethoxy)phenyl]fluorene (manufactured by SHIN-NAKAMURA CHEMICAL CO., LTD., product name: A-BPEF) |
| | B-2 | 9,9-bis[4-(2-vinyl ether ethoxy)phenyl]fluorene (manufactured by Maruzen Petrochemical Co., Ltd.) |
| | B-3 | Bisarylfluorene compound (manufactured by Osaka Gas Chemicals Co., Ltd., product name: OGSOL PG-100) |
| | B-4 | Bisarylfluorene compound (manufactured by Osaka Gas Chemicals Co., Ltd., product name: OGSOL CG-500) |
| Photopolymerization initiator (C) | C-1 | Irgacure 184 (manufactured by BASF Japan, Ltd.) |
| | C-2 | Irgacure 379 (manufactured by BASF Japan, Ltd.) |

TABLE 3-continued

| | Name | |
|---|---|---|
| | C-3 | WPI-113 (manufactured by Wako Pure Chemical Industries, Ltd.) |
| | C-4 | Irgacure 651 (manufactured by BASF Japan, Ltd.) |
| | C-5 | CPI-210S (manufactured by San-Apro Ltd.) |
| Viscosity-adjusting agent (D) | D-1 | Ethylene/methylphenyl norbornene copolymer (manufactured by Maruzen Petrochemical Co., Ltd.) |
| | D-2 | Poly(9-vinylcarbazole) (manufactured by Sigma-Aldrich) |
| Sensitizer (E) | E-1 | UVS-1221 (manufactured by Kawasaki Kasei Chemicals Ltd.) |
| Leveling agent (F) | F-1 | DISPARLON 1761 (manufactured by Kusumoto Chemicals, Ltd.) |
| Solvent (G) | G-1 | Cyclohexanone (manufactured by Wako Pure Chemical Industries, Ltd.) |
| Photocurable monomer (H) | H-1 | Tripropylene glycol diacrylate (manufactured by SHIN-NAKAMURA CHEMICAL CO., LTD., product name: APG-200) |
| | H-2 | Trimethylolpropane triacrylate (manufactured by SHIN-NAKAMURA CHEMICAL CO., LTD., product name: A-TMPT) |
| | H-3 | N-vinyl-2-pyrrolidone (manufactured by Wako Pure Chemical Industries, Ltd.) |
| | H-4 | 2-Phenoxyethyl acrylate (manufactured by SARTOMER JAPAN INC., SR339A) |

INDUSTRIAL APPLICABILITY

The optical element material of the present invention has a high refractive index, a small shrinkage on curing and has high heat resistance, and is industrially applicable as e.g. an optical element for a pickup lens for a MiniDisc or a pickup lens for a DVD, a member for a liquid crystal element, optical fibers, a prism, a microlens, a wafer level lens or a lens for a photoelectric conversion element.

The entire disclosure of Japanese Patent Application No. 2011-211445 filed on Sep. 27, 2011 including specification, claims, drawings and summary is incorporated herein by reference in its entirety.

The invention claimed is:

1. An optical element material obtained by a process consisting of curing a resin composition consisting of:

a photocurable monomer (A) having formula (1):

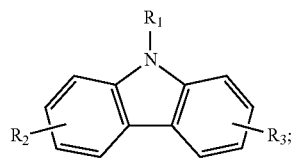

a photocurable monomer (B) having formula (2):

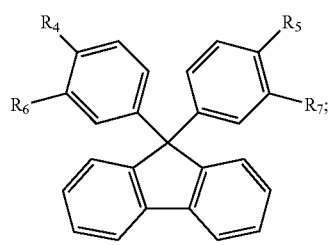

a photopolymerization initiator (C);
a viscosity-adjusting agent (D) other than a carbazole skeleton-containing polymer, said viscosity-adjusting agent (D) selected from the group consisting of a resin containing an aromatic ring, a resin containing a non-aromatic cyclic structure, a resin containing a hydroxyl group, and a resin containing a protected hydroxyl group;
optionally a solvent (G);
optionally a photocurable monomer (H) other than the photocurable monomer (A);
optionally a sensitizer;
optionally a coloring agent;
optionally a leveling agent;
optionally at least one additive selected from the group consisting of an antifoaming agent, an antioxidant, a heat-resistant stabilizer, a weather-resistant stabilizer, and a light stabilizer; and
optionally an adhesion-imparting agent,
wherein:
the resin composition has a weight ratio of the photocurable monomer (A) to the photocurable monomer (B) in a range of 30/70 to 85/15;
the resin composition has a content of the photopolymerization initiator (C) in a range of 0.01 to 30 parts by weight per 100 parts by weight of a total weight of the photocurable monomer (A) and the photocurable monomer (B);
the resin composition has a content of the viscosity-adjusting agent (D) in a range of 0.1 to 100 parts by weight per 100 parts by weight of the total weight of the photocurable monomer (A) and the photocurable monomer (B);
the resin composition has a shrinkage on curing of at most 4.5% at the time of curing;
$R_1$ is $-CH=CH_2$, $-CH_2CH_2-O-CH=CH_2$, $-CH_2-C(CH_3)=CH_2$ or a glycidyl group;
$R_2$ and $R_3$ are each independently hydrogen or a $C_{1-4}$ alkyl group;
$R_4$ and $R_5$ are each independently $-O-CH=CH_2$, $-O-CH_2CH_2-O-CH=CH_2$, $-O-CO-CH=CH_2$, $-O-CO-C(CH_3)=CH_2$, $-O-CH_2CH_2-O-CO-CH=CH_2$, $-O-CH_2CH_2-O-CO-C(CH_3)=CH_2$ or a glycidyl ether group; and
$R_6$ and $R_7$ are each independently hydrogen or a $C_{1-4}$ alkyl group.

2. The optical element material of claim 1, wherein the resin composition further comprises the solvent (G) in a range of 0.5 to 30,000 parts by weight per 100 parts by weight of the total weight of the photocurable monomer (A) and the photocurable monomer (B).

3. The optical element material of claim 1, wherein the optical element material has a refractive index to light having a wavelength of 589 nm of at least 1.58.

4. The optical element material of claim 1, wherein the optical element material has a glass transition temperature of at least 100° C.

5. The optical element material of claim 1, wherein the optical element material has a transmittance to light having a wavelength of 400 nm of at least 80% when the transmittance thickness is 20 um.

6. The optical element material of claim 1, wherein the optical element material is a film or a sheet having a resin thickness in the range of 50 nm to 10 mm.

7. The optical element material of claim 1, wherein the optical element material is in the form of a pickup lens, a non-objective lens, a polarizing film, a phase difference film, a light diffusing film, a condensing film, a lenticular sheet, a member for a liquid crystal element, a lens for a photoelectric conversion element, a microlens or a wafer level lens.

8. An optical element material obtained by a process consisting of curing a resin composition consisting of:

a photocurable monomer (A) having formula (1):

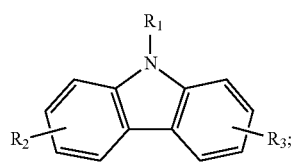

a photocurable monomer (B) having formula (2):

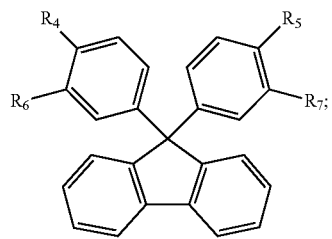

a photopolymerization initiator (C);
a viscosity-adjusting agent (D) other than a carbazole skeleton-containing polymer; and
optionally a solvent (G),
wherein:
the resin composition has a weight ratio of the photocurable monomer (A) to the photocurable monomer (B) in a range of 30/70 to 85/15;
the resin composition has a content of the photopolymerization initiator (C) in a range of 0.01 to 30 parts by weight per 100 parts by weight of a total weight of the photocurable monomer (A) and the photocurable monomer (B);
the resin composition has a content of the viscosity-adjusting agent (D) in a range of 0.1 to 100 parts by weight per 100 parts by weight of the total weight of the photocurable monomer (A) and the photocurable monomer (B);
the resin composition has a shrinkage on curing of at most 4.5% at the time of curing;
$R_1$ is —CH=CH$_2$—CH$_2$CH$_2$—O—CH=CH$_2$, —CH$_2$—C(CH$_3$)=CH$_2$ or a glycidyl group;
$R_2$ and $R_3$ are each independently hydrogen or a $C_{1-4}$ alkyl group,
$R_4$ and $R_5$ are each independently —O—CH=CH$_2$, —O—CH$_2$CH$_2$—O—CH=CH$_2$, —O—CO—CH=CH$_2$, —O—CO—C(CH$_3$)=CH$_2$—O—CH$_2$CH$_2$—O—CO—CH=CH$_2$, —O—CH$_2$CH$_2$—O—CO—C(CH$_3$)=CH$_2$ or a glycidyl ether group; and
$R_6$ and $R_7$ are each independently hydrogen or a $C_{1-4}$ alkyl group.

9. An optical element material obtained by a process consisting of curing a resin composition consisting of:

a photocurable monomer (A) having formula (1):

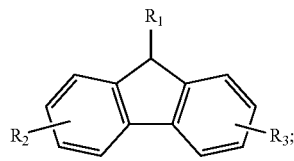

a photocurable monomer (B) having formula (2):

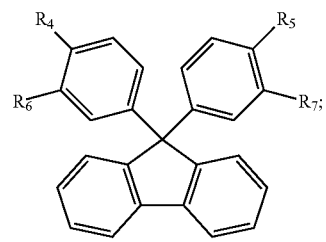

a photopolymerization initiator (C);
optionally a solvent (G),
wherein:
the resin composition has a weight ratio of the photocurable monomer (A) to the photocurable monomer (B) in a range of 30/70 to 85/15;
the resin composition has a content of the photopolymerization initiator (C) in a range of 0.01 to 30 parts by weight per 100 parts by weight of a total weight of the photocurable monomer (A) and the photocurable monomer (B);
the resin composition has a shrinkage on curing of at most 4.5% at the time of curing;
$R_1$ is —CH=CH$_2$—CH$_2$CH$_2$—O—CH=CH$_2$, —CH$_2$—C(CH$_3$)=CH$_2$ or a glycidyl group;
$R_2$ and $R_3$ are each independently hydrogen or a $C_{1-4}$ alkyl group;
$R_4$ and $R_5$ are each independently —O—CH=CH$_2$, —O—CH$_2$CH$_2$—O—CH=CH$_2$, —O—CO—CH=CH$_2$, —O—CO—C(CH$_3$)=CH$_2$—O—CH$_2$CH$_2$—O—CO—CH=CH$_2$, —O—CH$_2$CH$_2$—O—CO—C(CH)=CH$_2$ or a glycidyl ether group; and
$R_6$ and $R_7$ are each independently hydrogen or a $C_{1-4}$ alkyl group.

10. The optical element material of claim 1, wherein the resin composition has a weight ratio of the photocurable monomer (A) to the photocurable monomer (B) in a range of 30/70 to 50/50.

11. A method for producing the optical element material of claim 1, the method comprising:
applying the resin composition to a substrate to form a coating film; and
irradiating the surface of the coating film with light for curing with a shrinkage on curing of at most 4.5%.

12. The method of claim 11, further comprising:
transferring a pattern on the surface of the coating film by imprinting; and
irradiating the coating film with light to be suitable for curing.

13. The method of claim 11, wherein the substrate is a film or sheet made of a resin or an inorganic material having a thickness in a range of 0.5 μm to 10 mm.

* * * * *

UNITED STATES PATENT AND TRADEMARK OFFICE
CERTIFICATE OF CORRECTION

PATENT NO. : 9,574,106 B2  
APPLICATION NO. : 14/347474  
DATED : February 21, 2017  
INVENTOR(S) : Yoshihisa Hayashida et al.

Page 1 of 1

It is certified that error appears in the above-identified patent and that said Letters Patent is hereby corrected as shown below:

In the Claims

Column 35, Line 54: "—CH=CH$_2$—CH$_2$CH$_2$—O—CH=CH$_2$" should read:  
"—CH=CH$_2$, —CH$_2$CH$_2$—O—CH=CH$_2$"

Column 35, Line 58: "—O—CH=CH$_7$" should read: "—O—CH=CH$_2$"

Column 35, Lines 60-61: "—O—CO—C(CH$_3$)=CH$_2$—O—CH$_2$CH$_2$—O—CO—CH=CH$_2$" should read: "—O—CO—C(CH$_3$)=CH$_2$, —O—CH$_2$CH$_2$—O—CO—CH=CH$_2$"

Column 36, Line 38: "—CH=CH$_2$—CH$_2$CH$_2$—O—CH=CH$_2$" should read:  
"—CH=CH$_2$, —CH$_2$CH$_2$—O—CH=CH$_2$"

Column 36, Lines 44-45: "—O—CO—C(CH$_3$)=CH$_2$—O—CH$_2$CH$_2$—O—CO—CH=CH$_2$" should read: "—O—CO—C(CH$_3$)=CH$_2$, —O—CH$_2$CH$_2$—O—CO—CH=CH$_2$"

Signed and Sealed this  
Nineteenth Day of June, 2018

Andrei Iancu  
*Director of the United States Patent and Trademark Office*